US011382289B2

(12) United States Patent
Joseph et al.

(10) Patent No.: US 11,382,289 B2
(45) Date of Patent: *Jul. 12, 2022

(54) GROWING SYSTEMS AND METHODS

(71) Applicant: Massivia Grow Holdings LLC, Pasco, WA (US)

(72) Inventors: Timothy E. Joseph, Pasco, WA (US); Zachary E. K. Rubenson, Ashland, OR (US); Bryan M. Dripps, Rockaway, OR (US); Joseph L. Capoccia, Monrovia, CA (US); Alex A. Thomsen, Portland, OR (US)

(73) Assignee: Massivia Grow Holdings, LLC, Richland, WA (US)

( * ) Notice: Subject to any disclaimer, the term of this patent is extended or adjusted under 35 U.S.C. 154(b) by 734 days.

This patent is subject to a terminal disclaimer.

(21) Appl. No.: 16/133,620

(22) Filed: Sep. 17, 2018

(65) Prior Publication Data

US 2019/0133062 A1 May 9, 2019
US 2021/0204498 A9 Jul. 8, 2021

Related U.S. Application Data

(60) Continuation of application No. 15/799,961, filed on Oct. 31, 2017, now Pat. No. 10,076,090, which is a
(Continued)

(51) Int. Cl.
*A01G 31/06* (2006.01)
*A01G 31/04* (2006.01)
(Continued)

(52) U.S. Cl.
CPC ............ *A01G 31/06* (2013.01); *A01G 9/022* (2013.01); *A01G 22/25* (2018.02); *A01G 31/04* (2013.01);
(Continued)

(58) Field of Classification Search
CPC ................................ A01G 9/022; A01G 31/06
See application file for complete search history.

(56) References Cited

U.S. PATENT DOCUMENTS 3,293,798 A  12/1966 Johnson, Sr.
3,717,953 A   2/1973 Kuhn et al.
(Continued)

FOREIGN PATENT DOCUMENTS

EP    0672589 A1   9/1995
GB    2477216 B    8/2014
(Continued)

OTHER PUBLICATIONS

International Search Report dated Jan. 6, 2017 in PCT/US16/56191, filed Oct. 7, 2016.
(Continued)

*Primary Examiner* — Monica L Barlow
(74) *Attorney, Agent, or Firm* — John F. Rollins

(57) ABSTRACT

Growing systems may include a number of modular growing chambers adapted to be configured in a stacked arrangement with each growing chamber surrounding a corresponding portion of the plant. The grow chambers may be selectively added or removed during plant growth, such that different sections of the growing plant may be influenced differently using aeroponic, hydroponic or other growing techniques. The grow chamber stack may be portable and provided with integrated or independent lifting devices to assist an operator in adding or removing chambers from the stack. Three growing processes may be facilitated using such systems. These include a process for producing assorted product from a single plant for simultaneous harvest, a process for producing an extended harvest of a desired size product from a
(Continued)

single plant, and a process for extending the productive life of a plant and provide for multiple, continued, and perpetual harvest.

18 Claims, 42 Drawing Sheets

Related U.S. Application Data division of application No. 15/289,072, filed on Oct. 7, 2016, now Pat. No. 9,848,545.

(60) Provisional application No. 62/238,733, filed on Oct. 8, 2015.

(51) Int. Cl.
  *A01G 22/25* (2018.01)
  *A01G 9/02* (2018.01)
  *A01G 31/00* (2018.01)
  *A01G 2/00* (2018.01)

(52) U.S. Cl.
  CPC .......... *A01G 2/00* (2018.02); *A01G 2031/006* (2013.01); *Y02P 60/21* (2015.11)

(56) References Cited

U.S. PATENT DOCUMENTS

| | | | |
|---|---|---|---|
| 4,115,950 A | 9/1978 | Lantai | |
| 4,145,841 A | 3/1979 | Woolpert | |
| 4,348,831 A | 9/1982 | Chambers | |
| 4,369,598 A | 1/1983 | Beckwith | |
| 4,736,543 A | 4/1988 | Erdmann | |
| 4,779,378 A | 10/1988 | Mason, Jr. | |
| 4,901,471 A | 2/1990 | Top | |
| 5,136,807 A | 8/1992 | Orlov | |
| 5,404,672 A | 4/1995 | Sanderson | |
| 5,918,415 A | 7/1999 | Locke et al. | |
| 5,930,951 A | 8/1999 | Wong | |
| 6,088,958 A | 7/2000 | Oka et al. | |
| 6,109,011 A | 8/2000 | Iyer et al. | |
| 6,612,073 B1 | 9/2003 | Powell et al. | |
| 7,080,482 B1 | 7/2006 | Bradley | |
| 7,516,574 B2 | 4/2009 | Gottlieb et al. | |
| 8,250,809 B2 | 8/2012 | Simmons | |
| 8,887,439 B2 * | 11/2014 | Daas | A01G 31/02 47/66.7 |
| 9,848,545 B2 | 12/2017 | Joseph et al. | |
| 10,076,090 B2 | 9/2018 | Joseph et al. | |
| 2004/0010971 A1 | 1/2004 | Redfield et al. | |
| 2004/0089657 A1 | 5/2004 | Waszak | |
| 2006/0032128 A1 | 2/2006 | Bryan | |
| 2009/0320367 A1 | 12/2009 | Smith et al. | |
| 2010/0218423 A1 | 9/2010 | Walhovd | |
| 2011/0061296 A1 | 3/2011 | Simmons | |
| 2012/0060416 A1 | 3/2012 | Brusatore | |
| 2012/0167460 A1 | 7/2012 | Omidi | |
| 2013/0067810 A1 | 3/2013 | Kamau | |
| 2013/0111812 A1 | 5/2013 | Fisher | |
| 2013/0160362 A1 | 6/2013 | Daas et al. | |
| 2014/0075841 A1 | 3/2014 | Degraff | |
| 2014/0083009 A1 | 3/2014 | Panopoulos et al. | |
| 2015/0096230 A1 | 4/2015 | Ankner | |
| 2015/0223418 A1 | 8/2015 | Collins et al. | |
| 2017/0099791 A1 | 4/2017 | Joseph et al. | |

FOREIGN PATENT DOCUMENTS

| | | |
|---|---|---|
| JP | S5111422 A | 1/1976 |
| JP | H0923772 A | 1/1997 |
| JP | 2010166854 A | 8/2010 |
| JP | 2013504327 A | 2/2013 |
| JP | 2014207869 | 11/2014 |

OTHER PUBLICATIONS

ISR and Written Opinion dated Jan. 6, 2017 in Int'l Application No. PCT/US16/56191.

Musslewhite, James. "How You Can Grow 100 Pounds of Potatoes in 4 Square Feet", Published May 7, 2014, Living in Cebu Forums, retrieved by Examiner on Sep. 19, 2019 from https ://www .livingincebuforums .com/topic/71220-how-you-can-grow-100-pounds-of-potatoes-in-4-square-feet/ (Year: 2014).

Torpey, Jodi. "Potato box yields scads of spuds", Apr. 7, 2010, The Denver Post, retrieved by Examiner on Sep. 19, 2019 from https:// www.denverpost.com/2010/04/07/potato-box-yields-scads-of-spuds/ (Year: 2010).

* cited by examiner

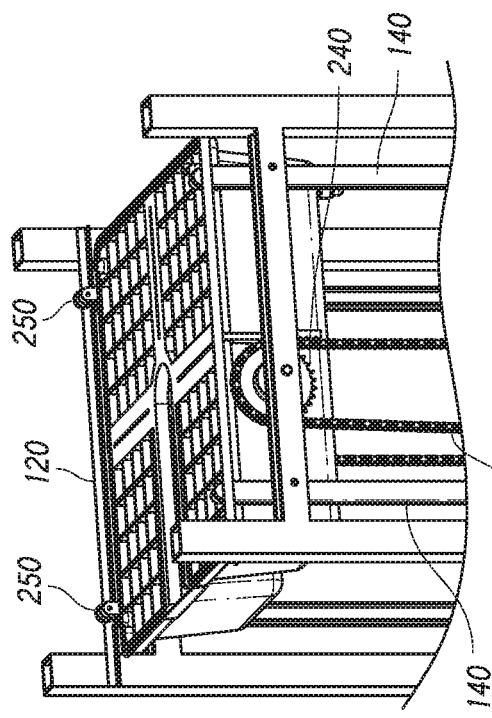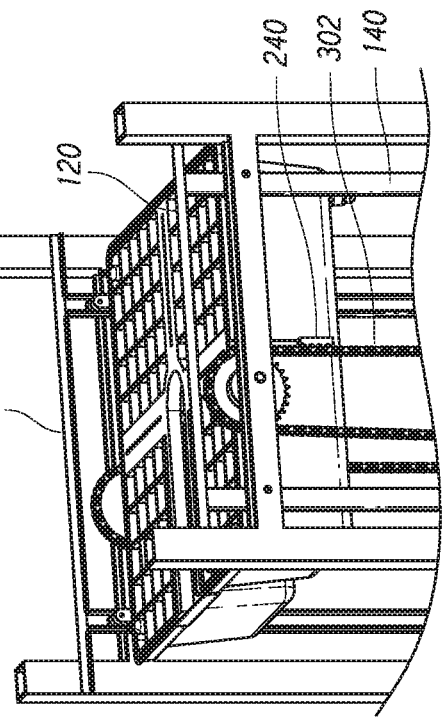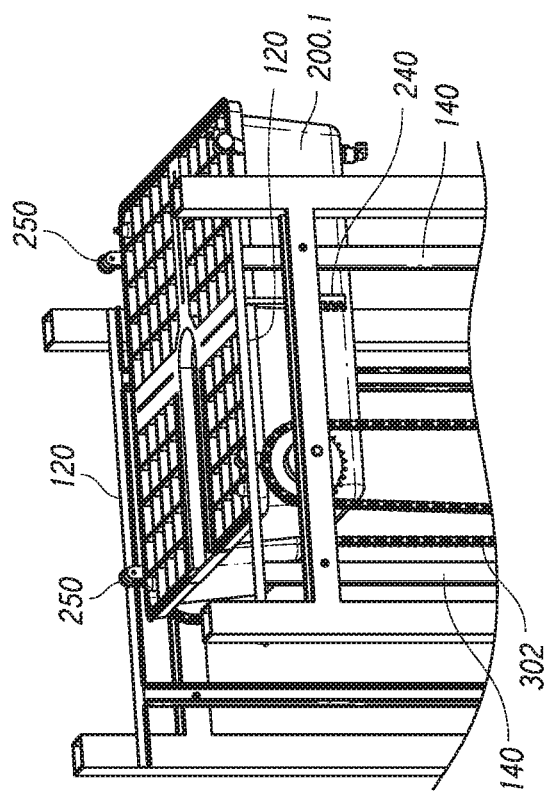

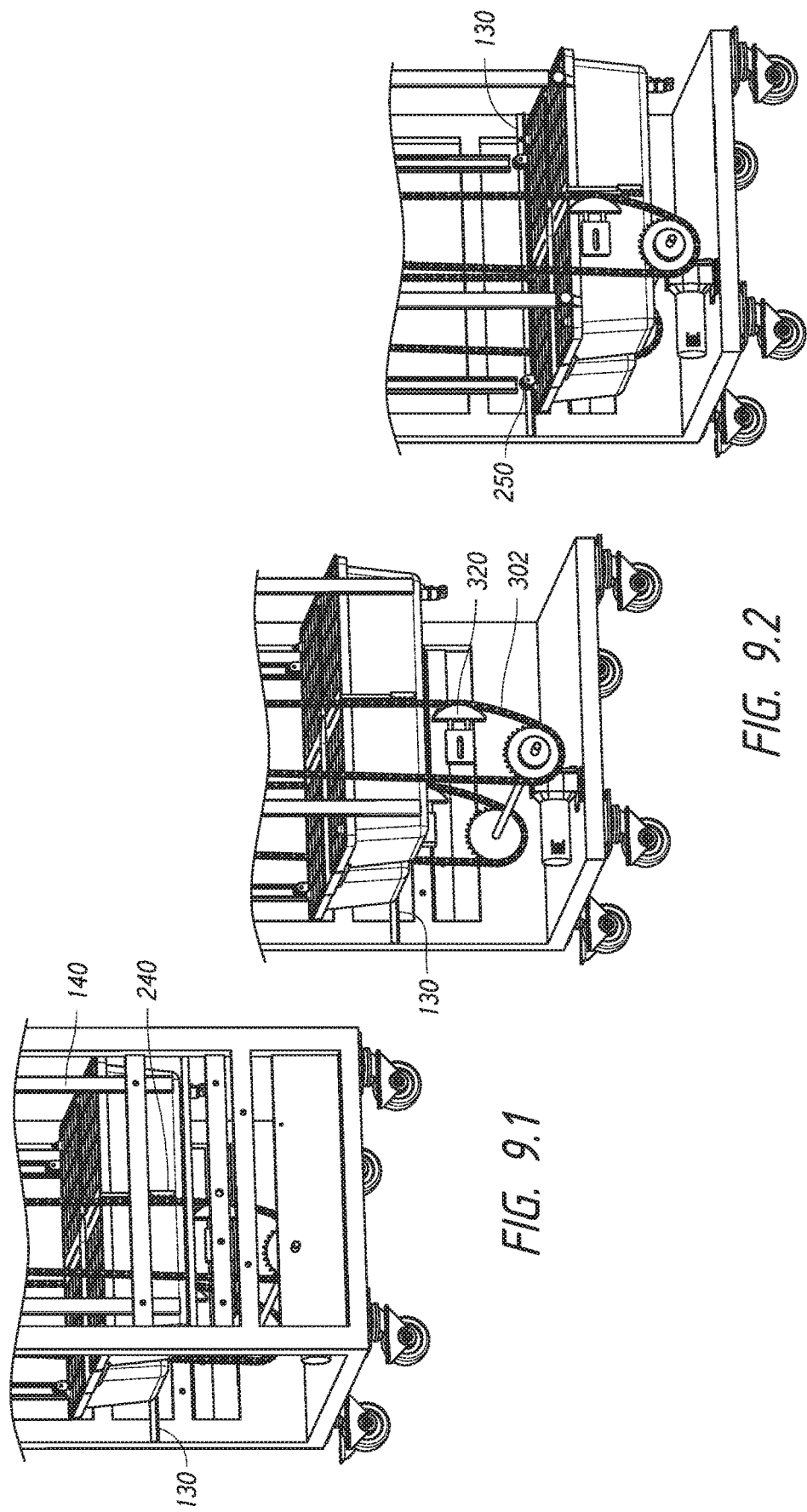

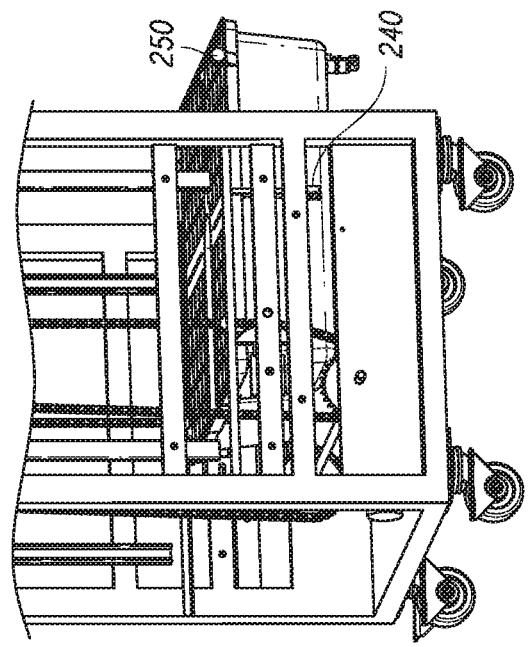
FIG. 9.5
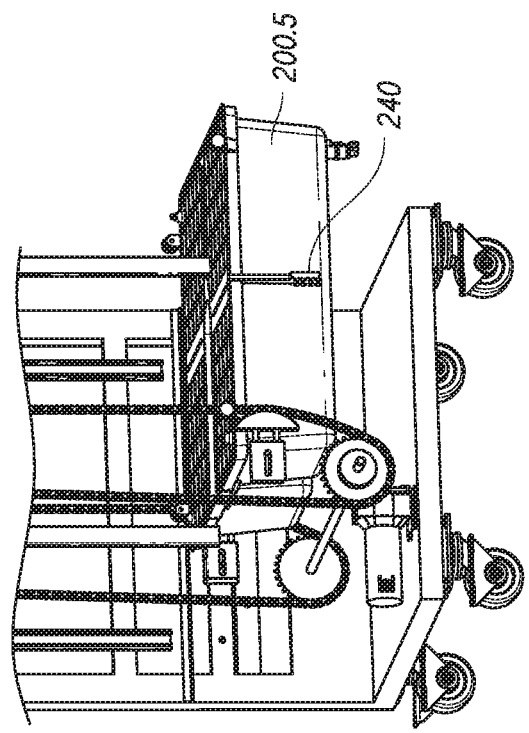
FIG. 9.4

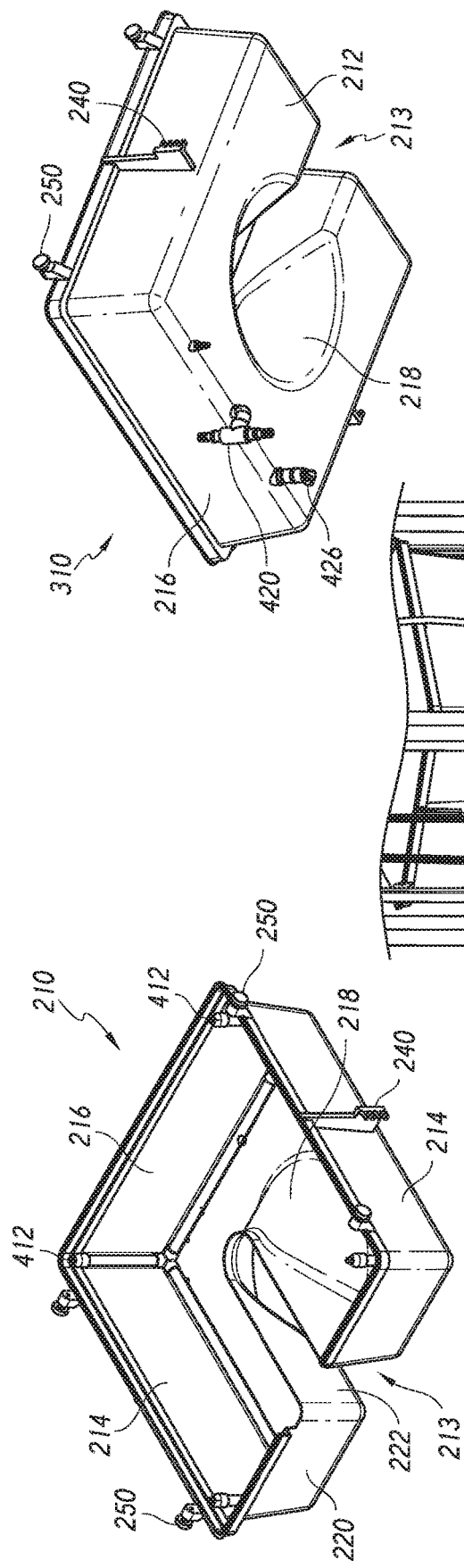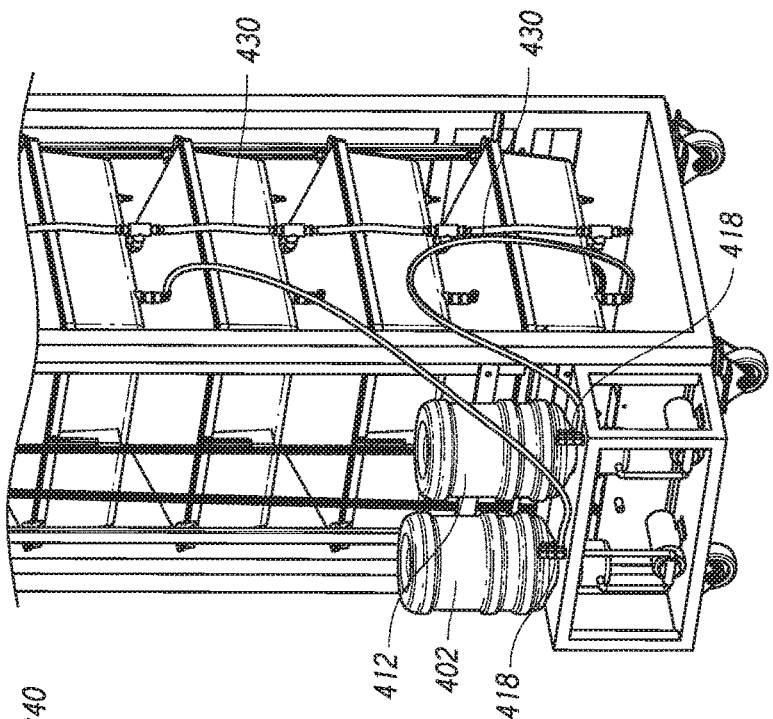

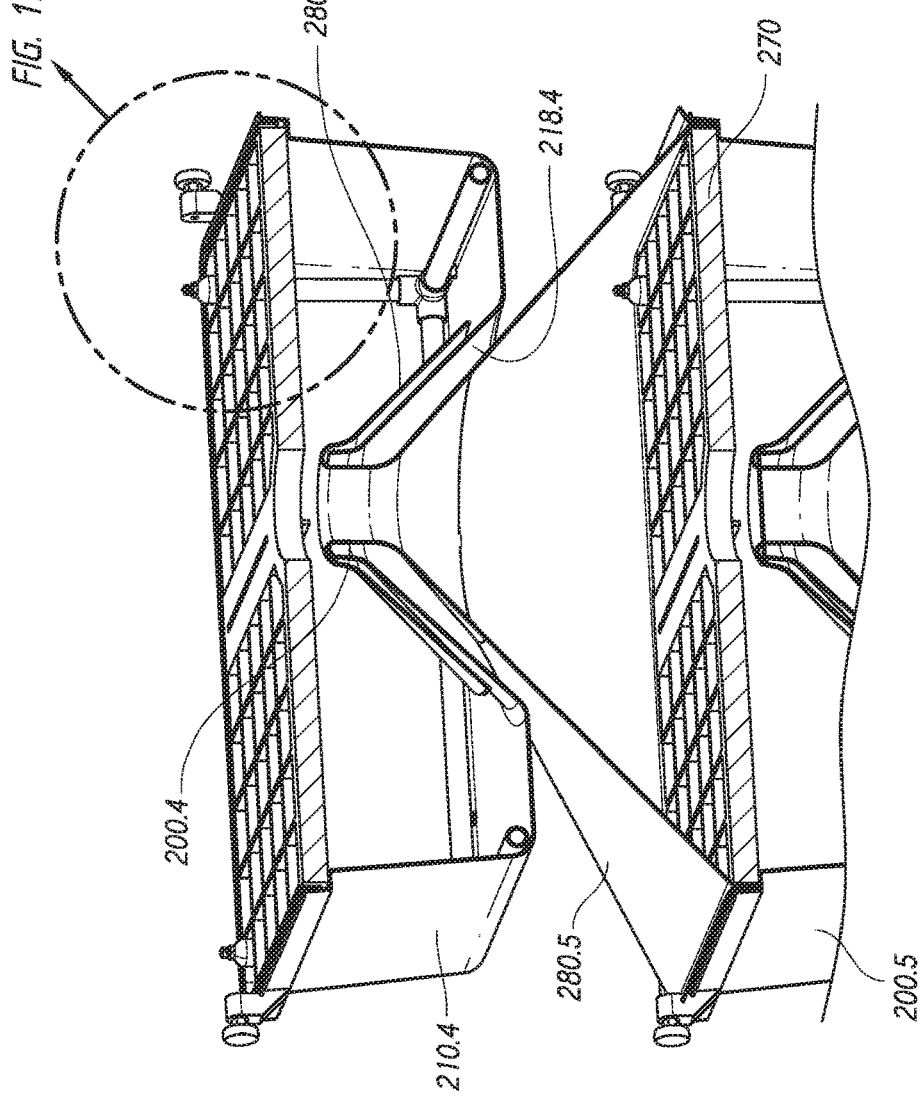
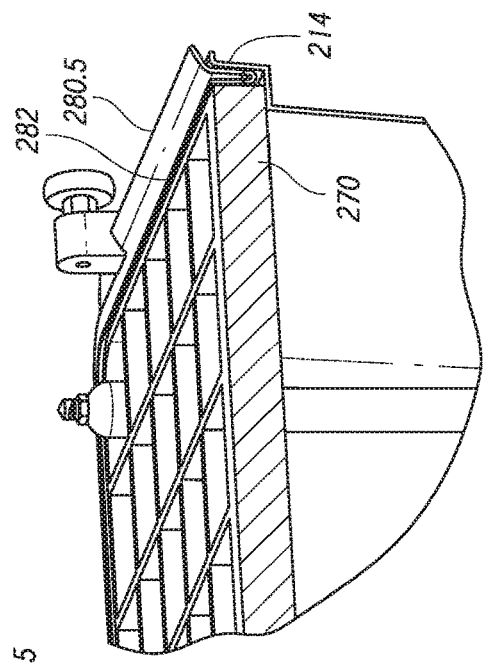
FIG. 17.1
FIG. 17.2

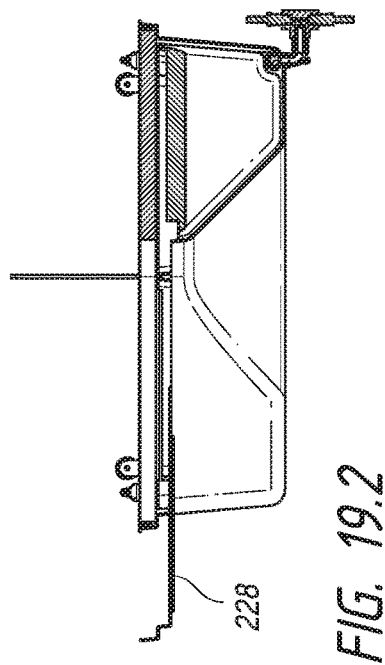
FIG. 19.2
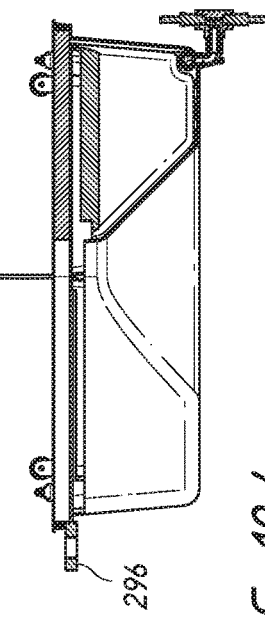
FIG. 19.4
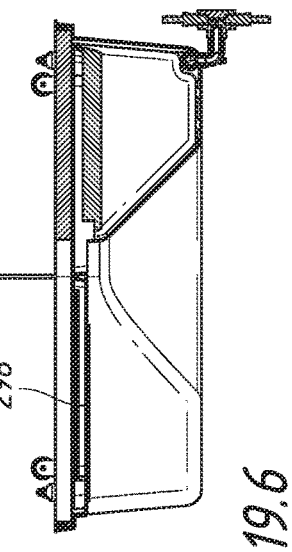
FIG. 19.6
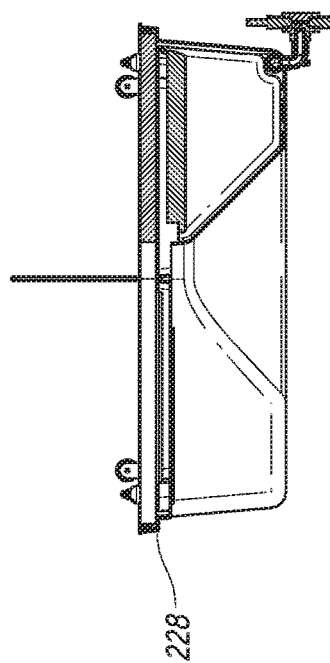
FIG. 19.1
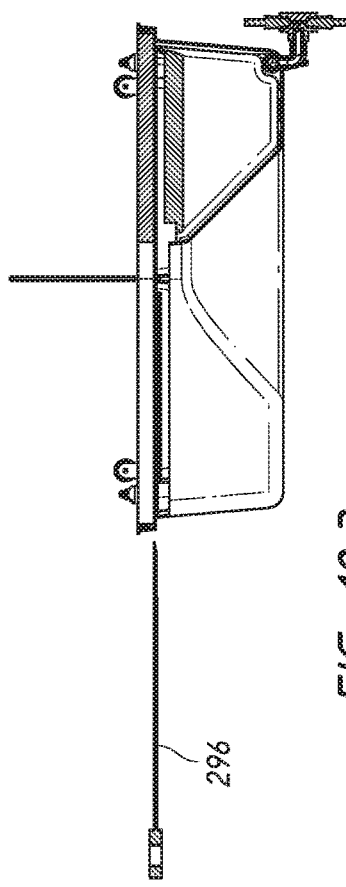
FIG. 19.3
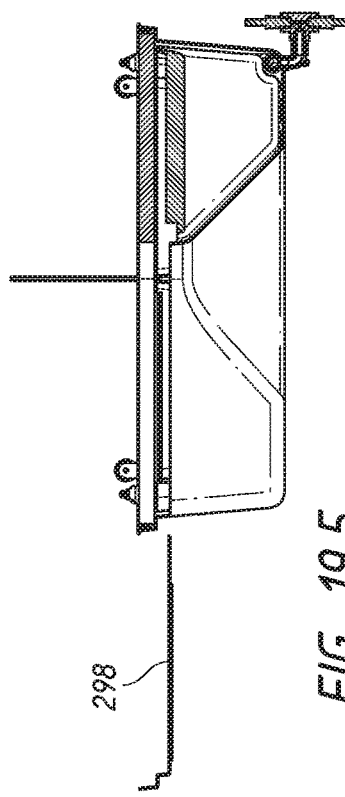
FIG. 19.5

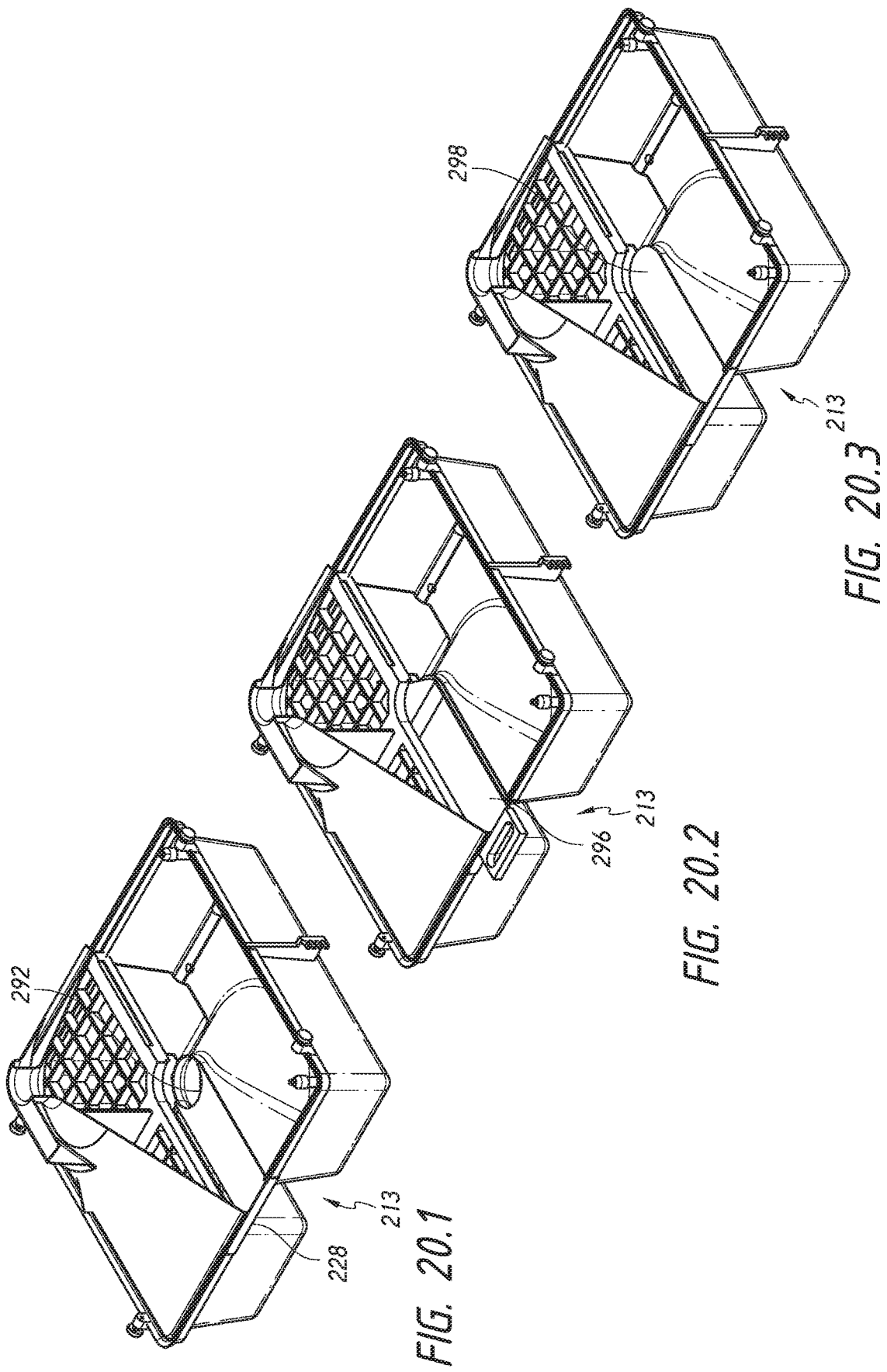

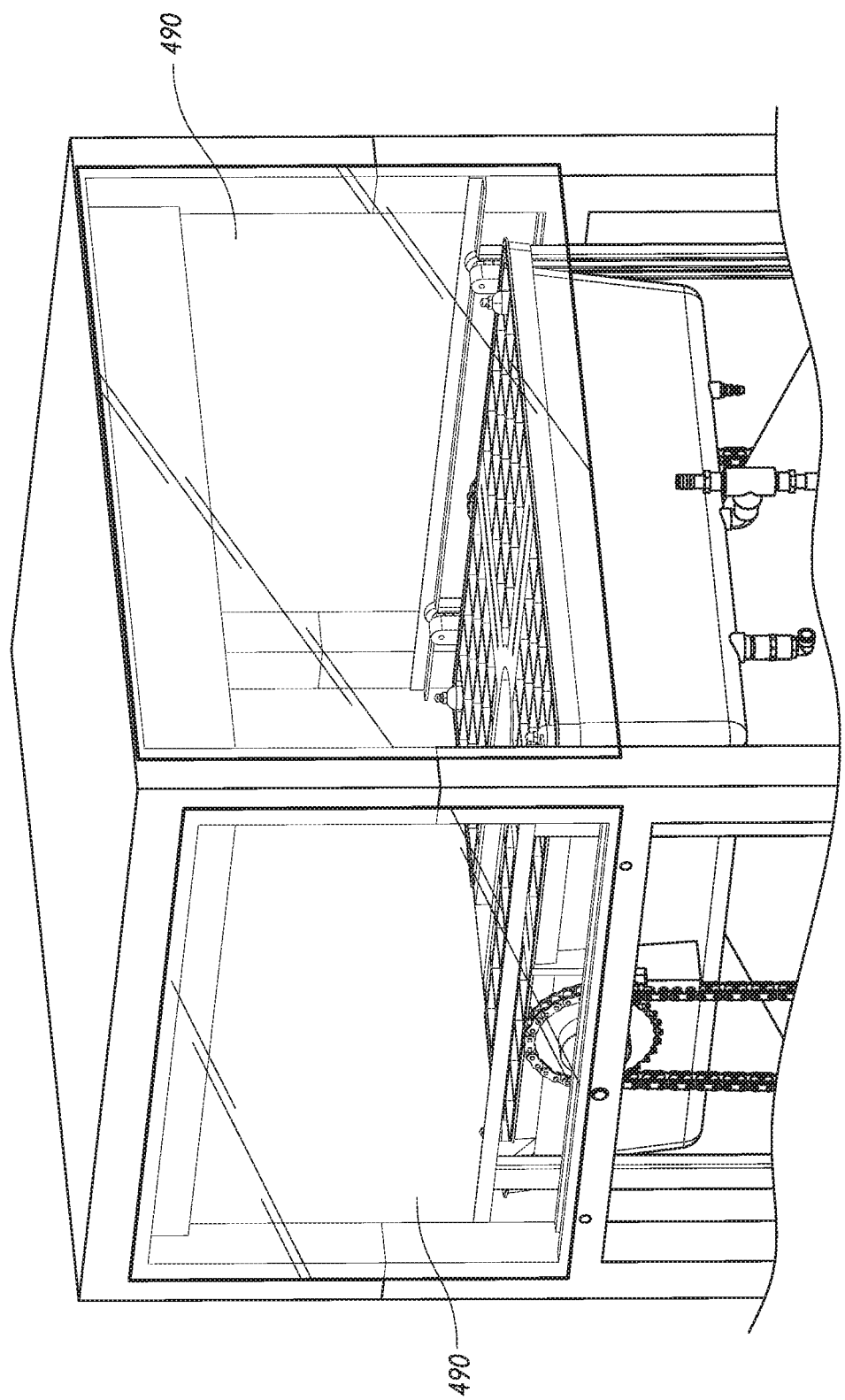

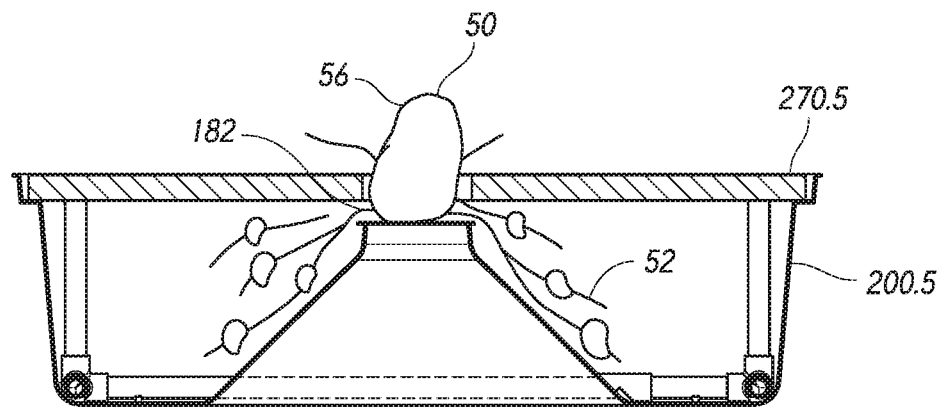
FIG. 23.1
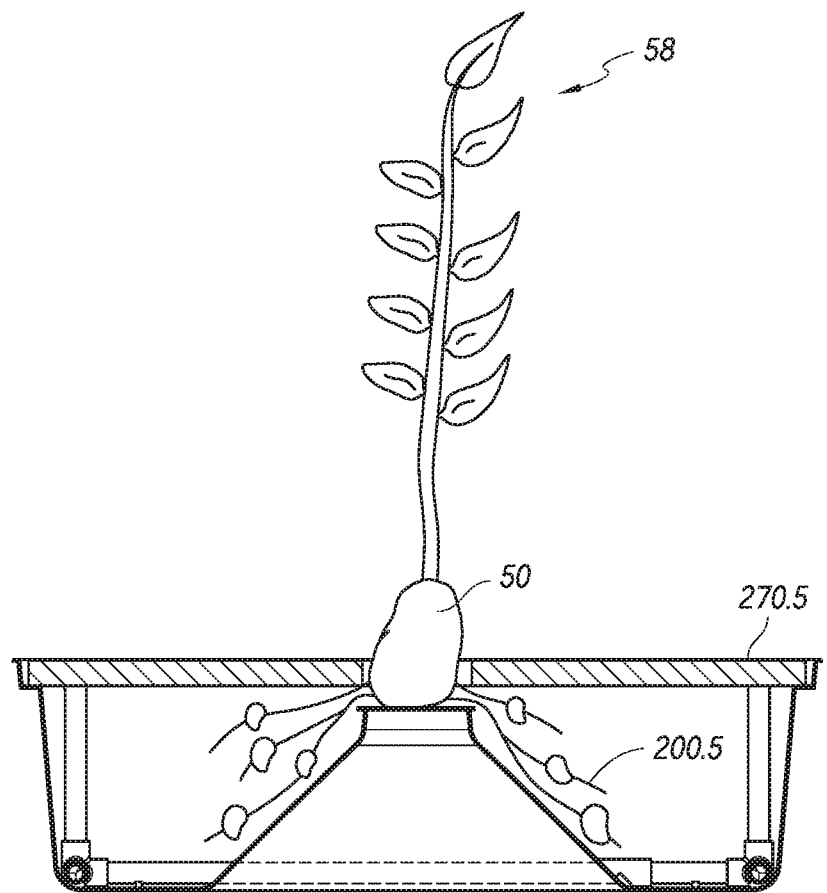
FIG. 23.2

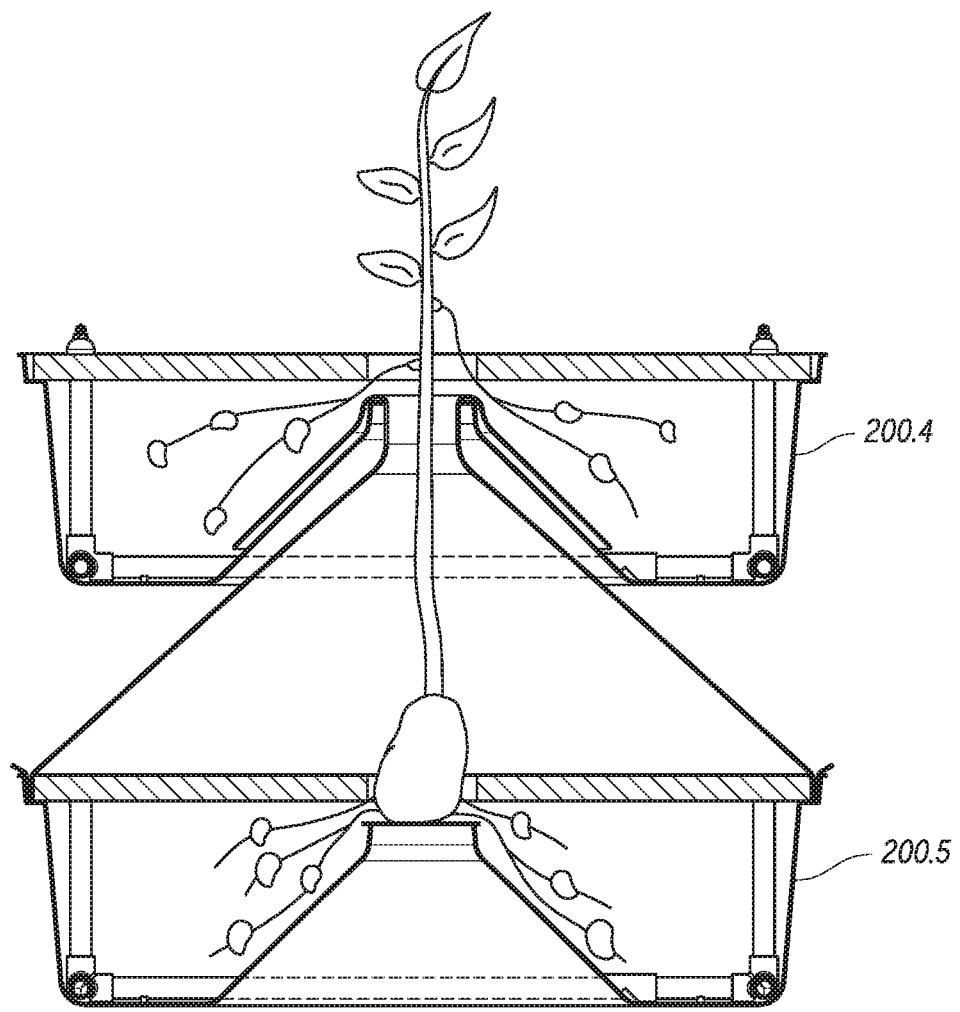
FIG. 23.3

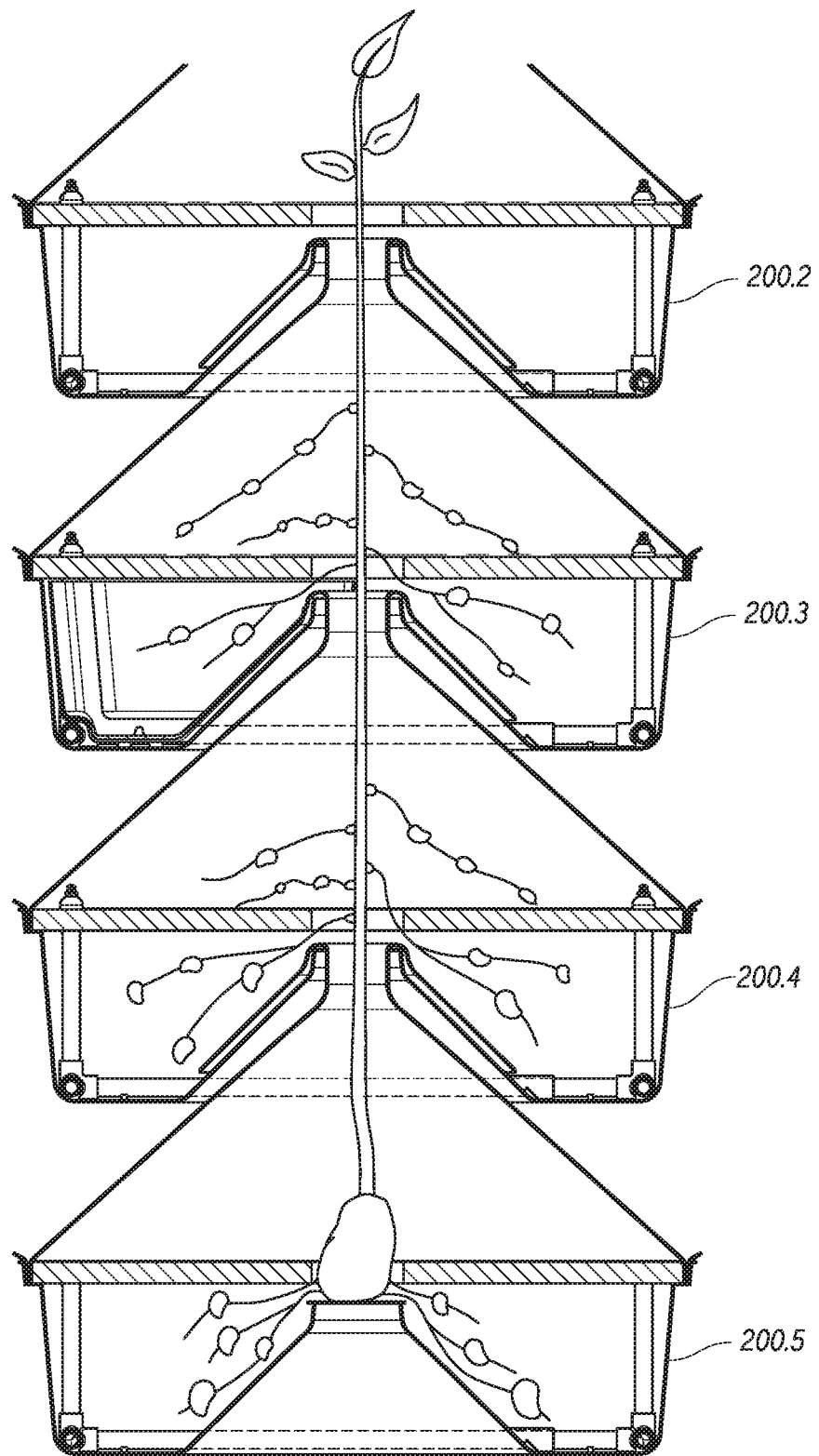
FIG. 23.4

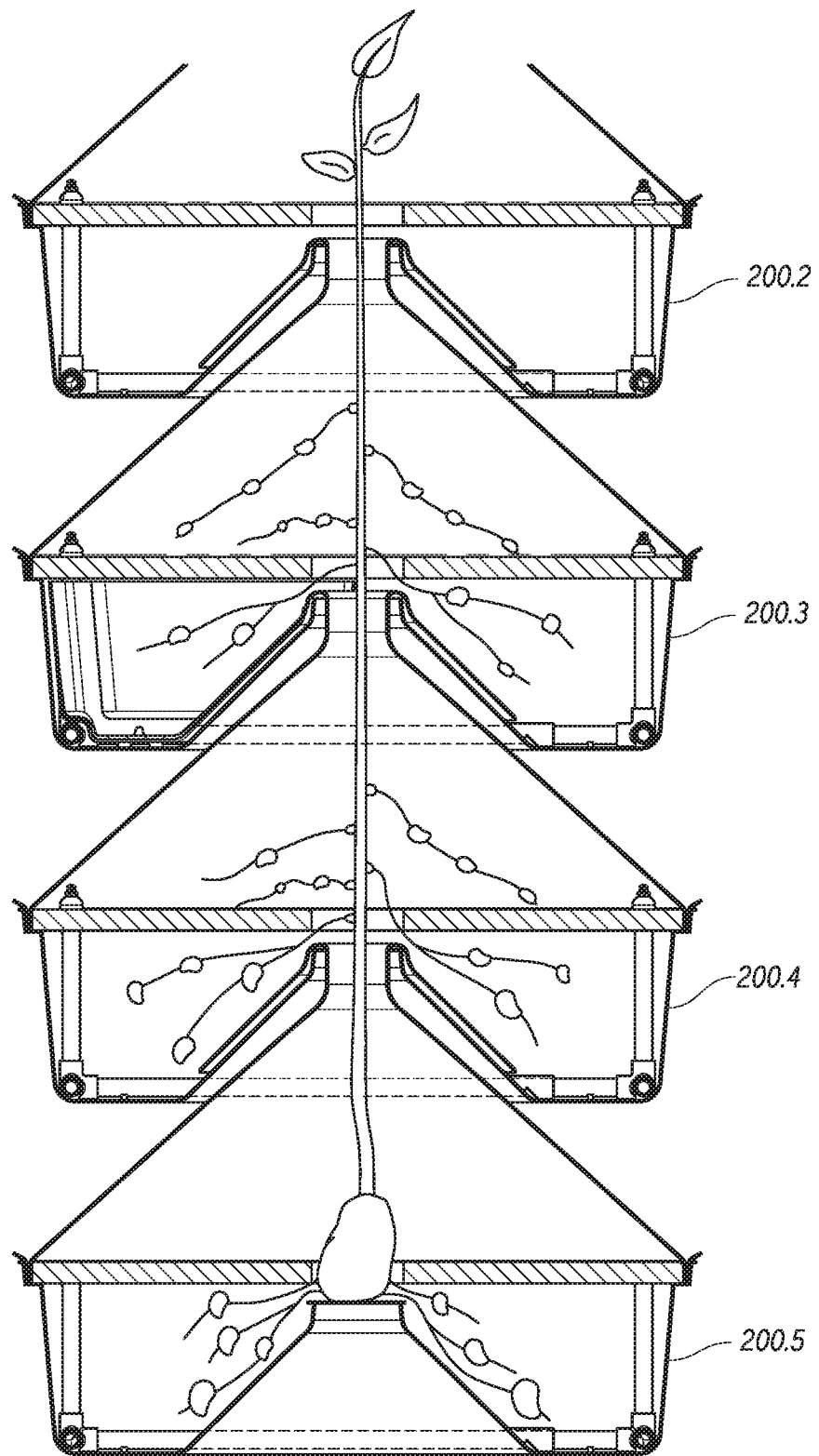
FIG. 23.4

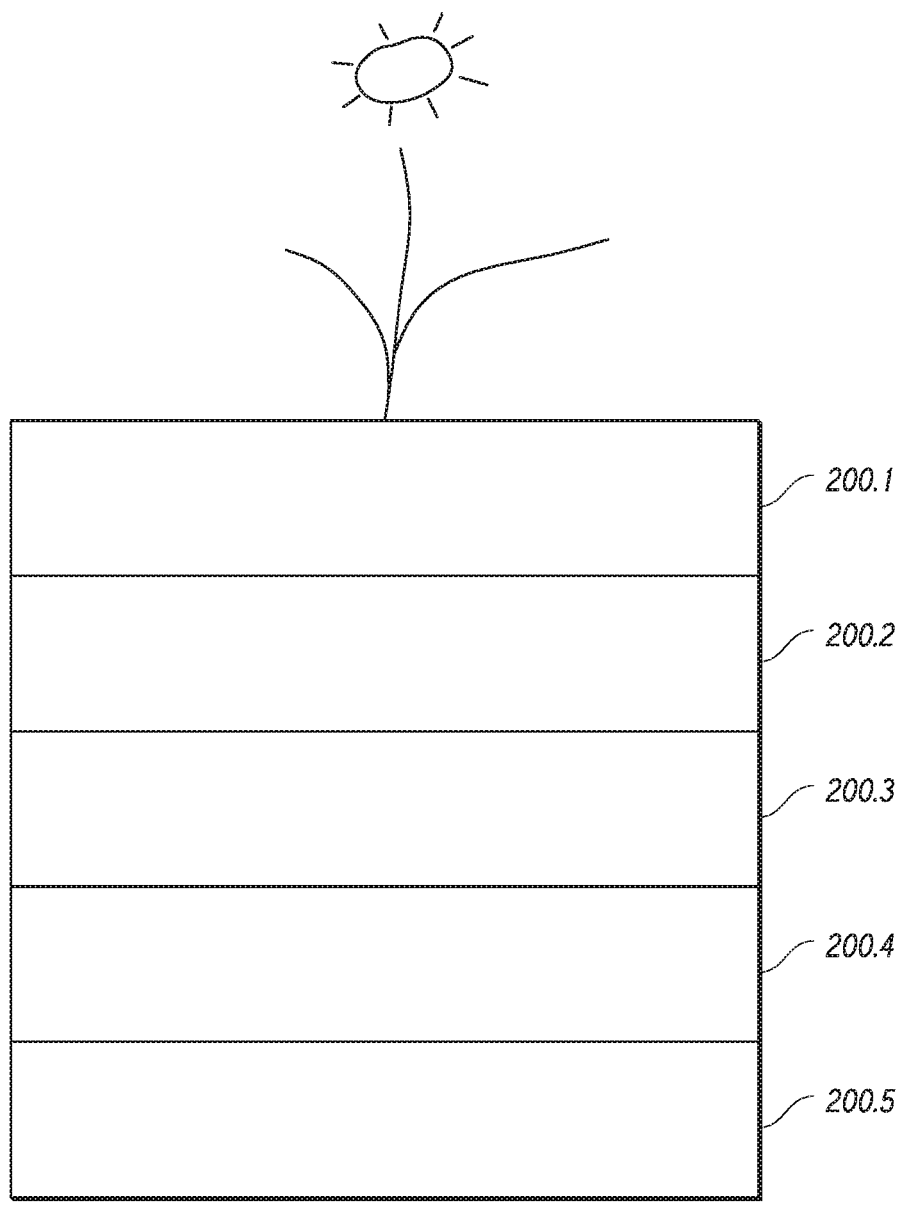
FIG. 23.5

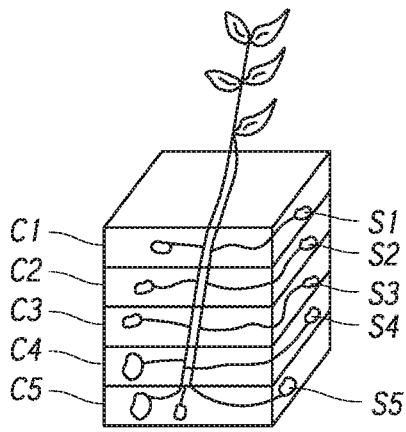
FIG. 24.1
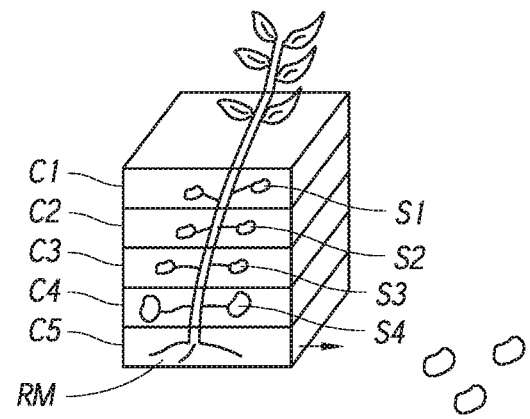
FIG. 24.2
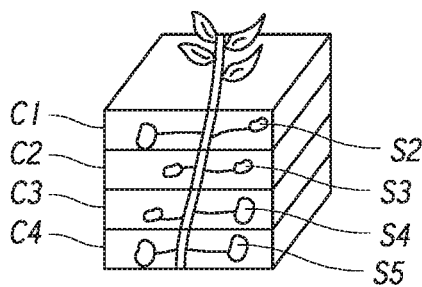
FIG. 24.3
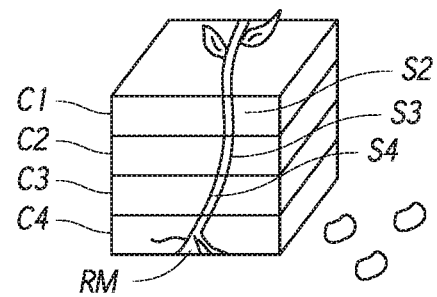
FIG. 24.4
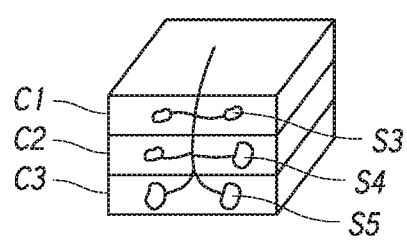
FIG. 24.5

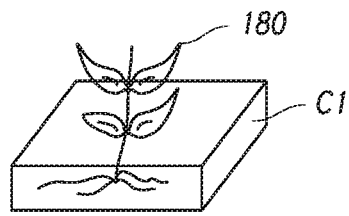
FIG. 25.1
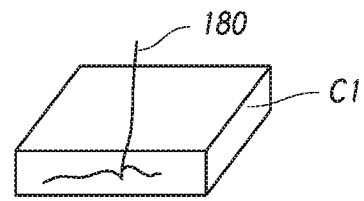
FIG. 25.2
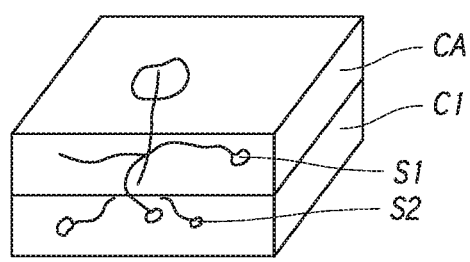
FIG. 25.3
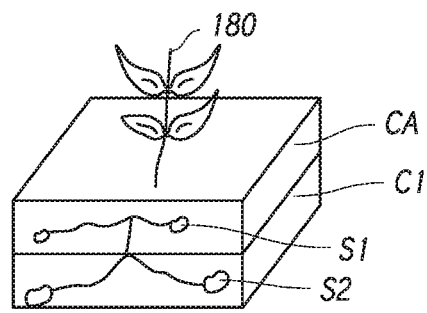
FIG. 25.4
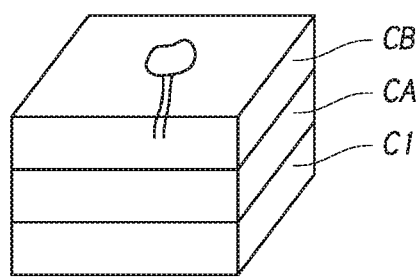
FIG. 25.5

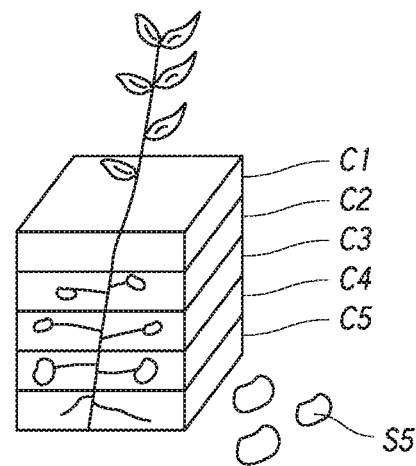
FIG. 26.1
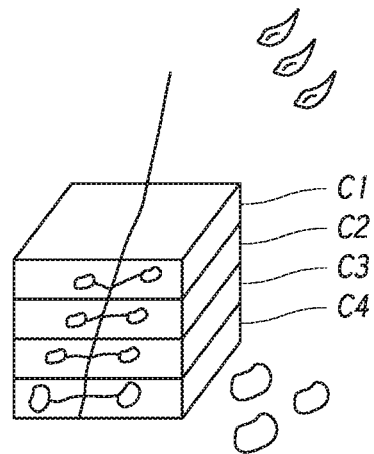
FIG. 26.2
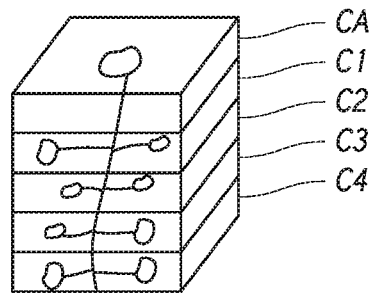
FIG. 26.3
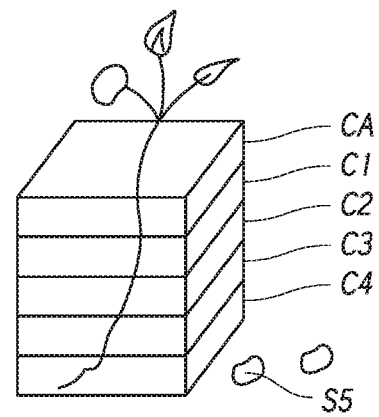
FIG. 26.4
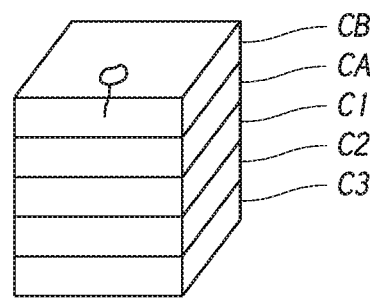
FIG. 26.5

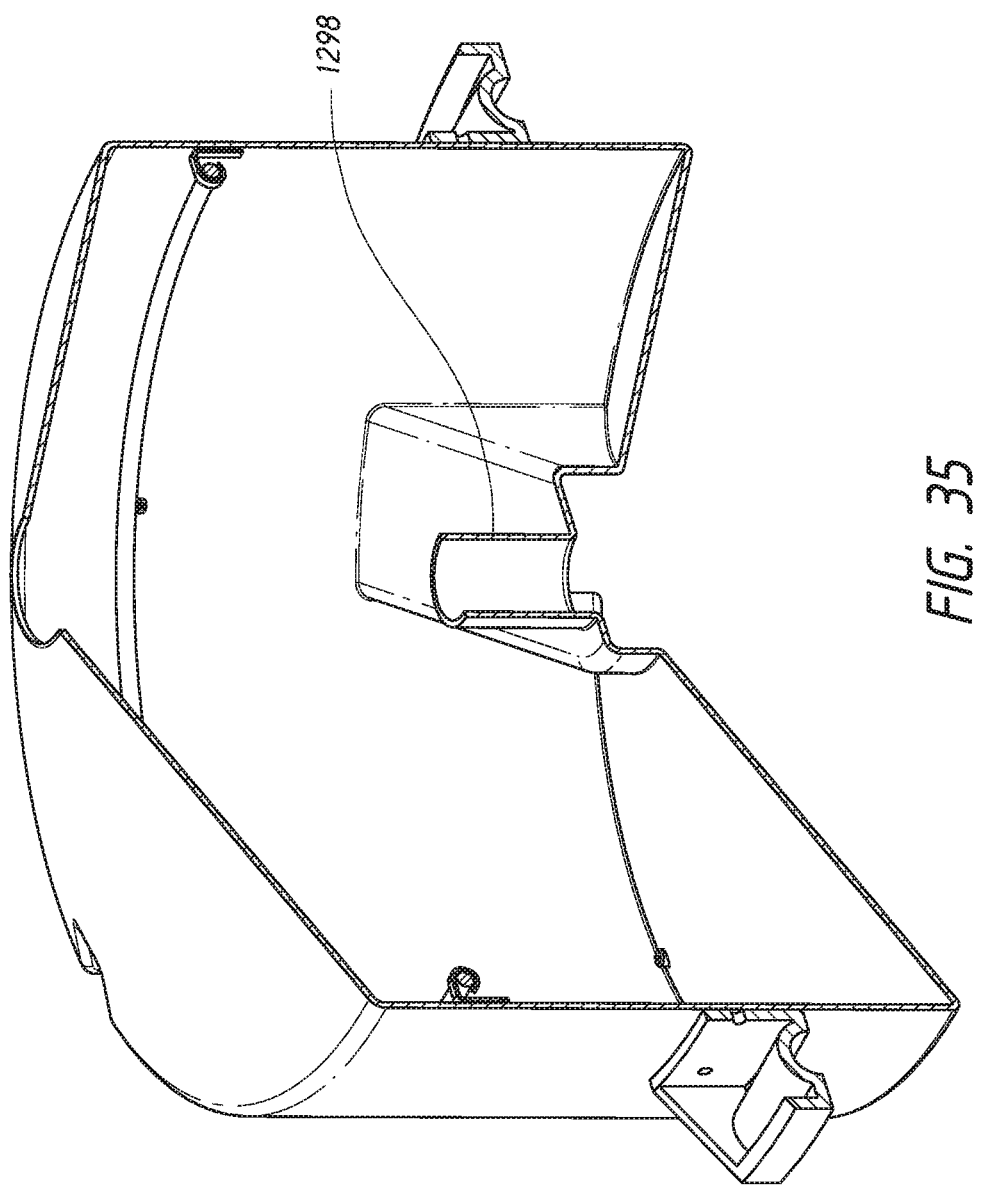

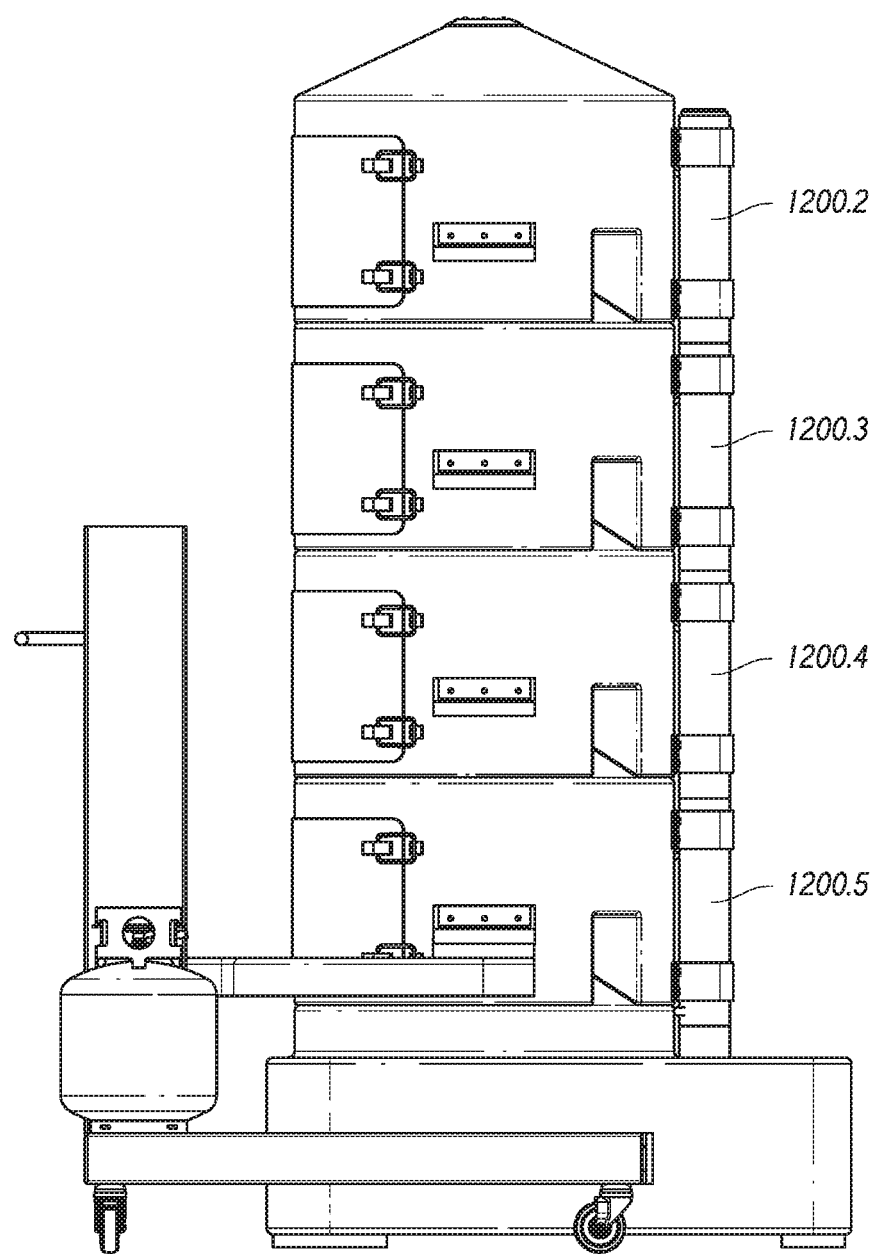
FIG. 37.1

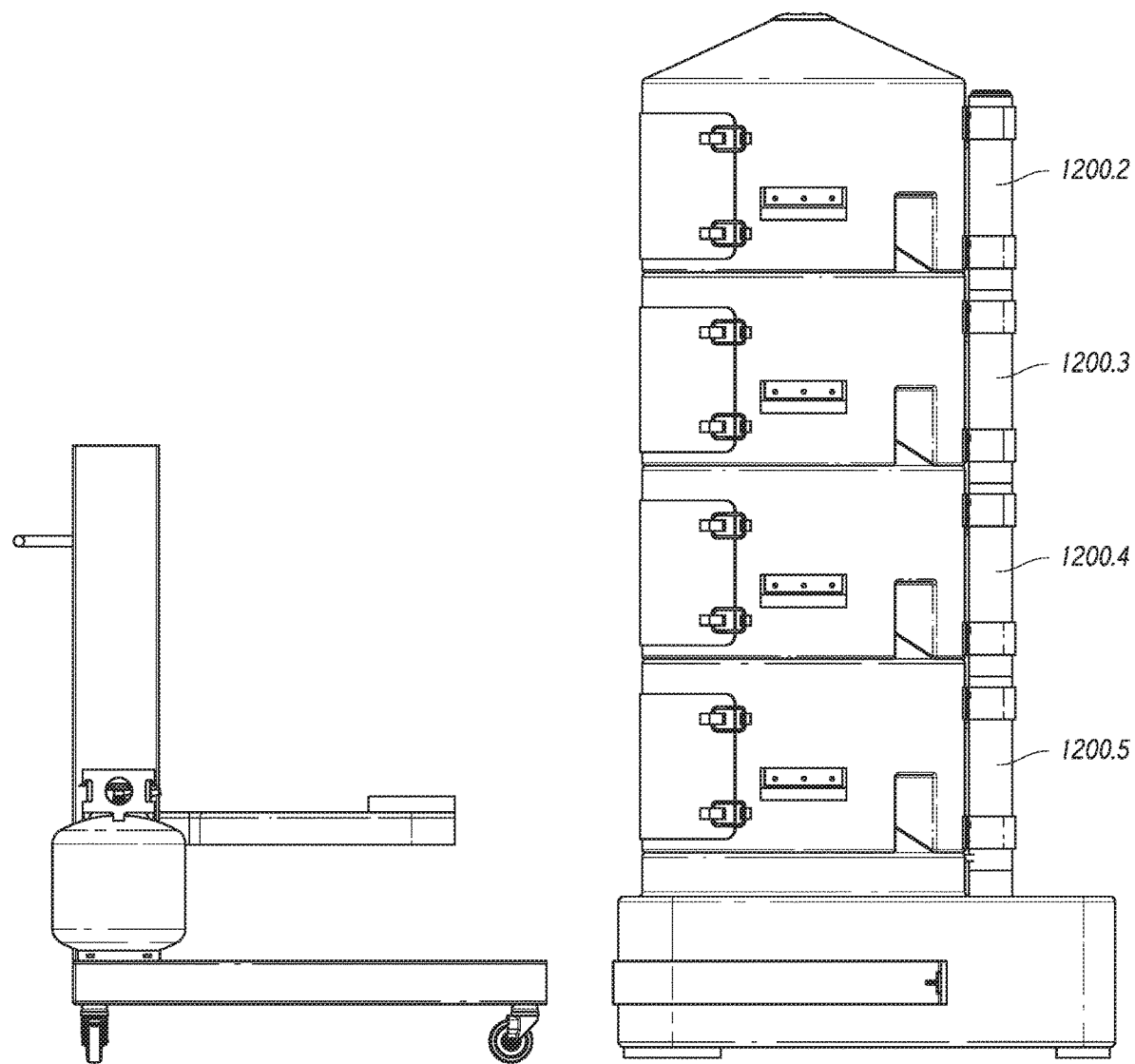
FIG. 37.2

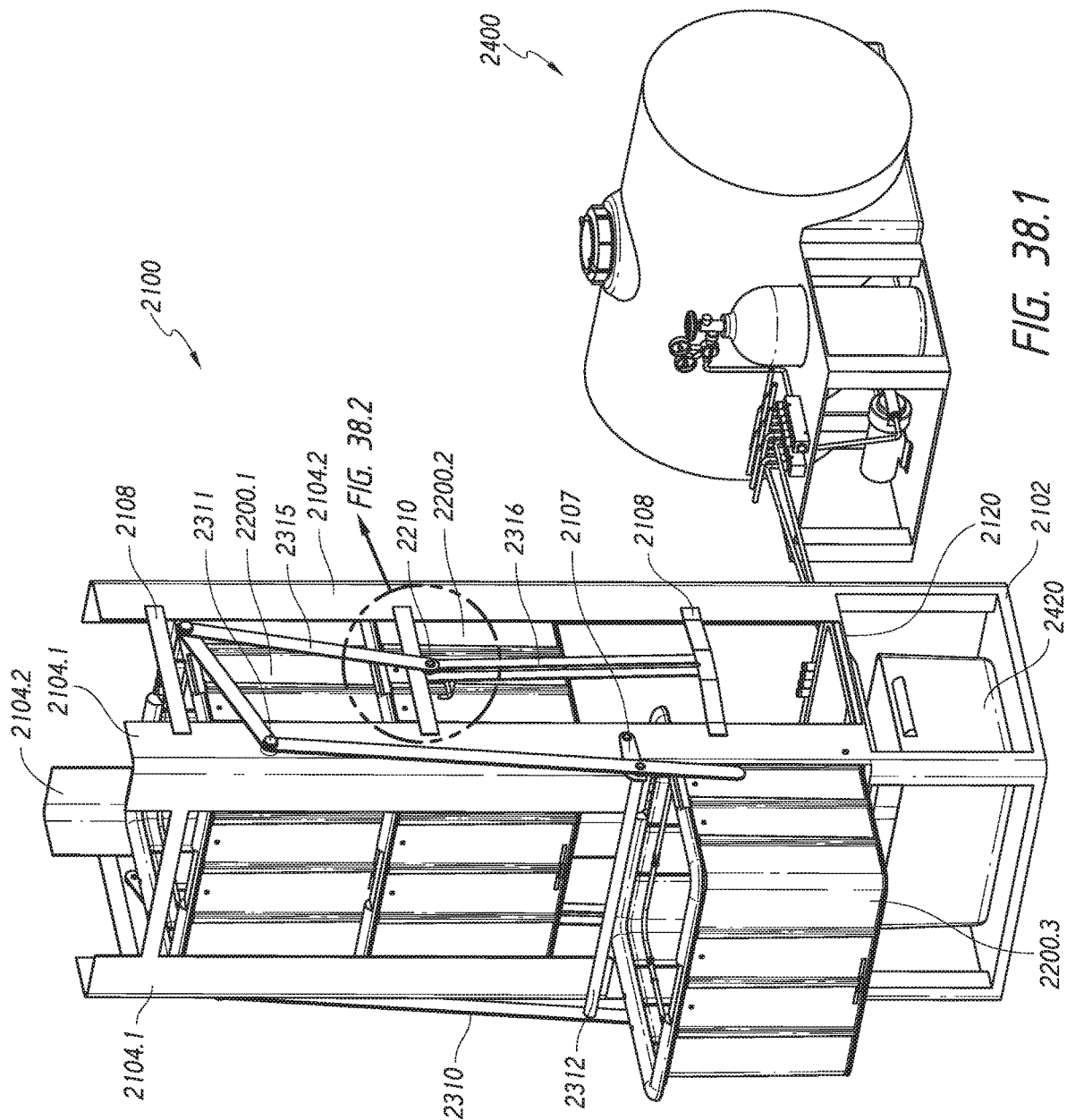

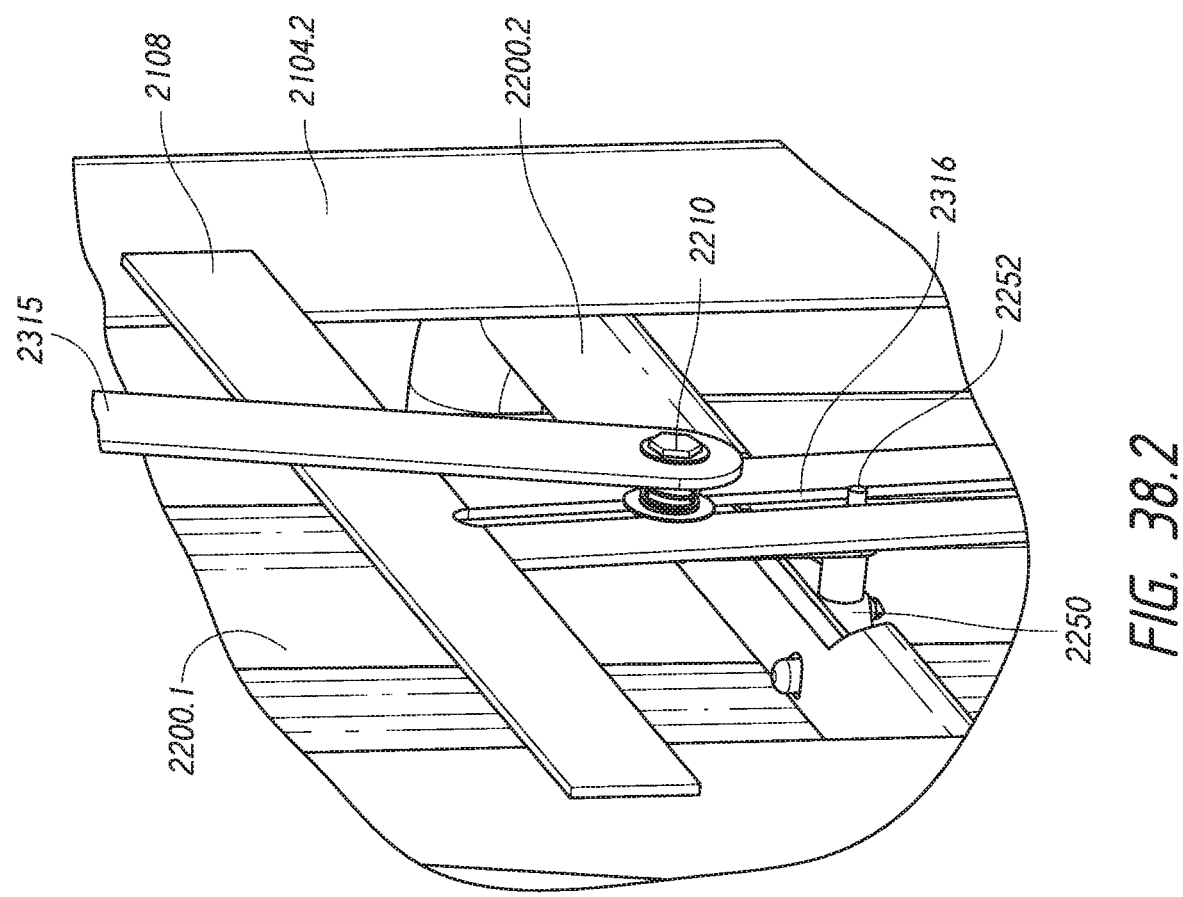
FIG. 38.2

GROWING SYSTEMS AND METHODS

PRIORITY CLAIM AND REFERENCE TO RELATED APPLICATIONS

This application is a continuation of U.S. application Ser. No. 15/799,961 filed on Oct. 31, 2017, titled GROWING SYSTEMS AND METHODS, and claims priority under all applicable laws, treaties and regulations thereto. The subject matter of that same application is incorporated by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Technical Field

The disclosure relates to systems and methods for growing plants, including stationary and/or portable systems for hydro-cultural growing of plants in aeroponic and hydroponic environments.

2. Prior Art

The term "aeroponics" refers to the growing of plants in an air or mist environment without the use of soil or another aggregate medium. The basic principle of aeroponic growing is to suspend plants on a plant support structure and grow the suspended plants in a closed or semi-closed environment by spraying the plant's dangling roots and lower stem with, nutrient-rich water solution. The leaves and crown of the plant, often called the canopy, extend above the plant support structure and the roots of the plant extend below the plant support structure. Ideally, the environment is kept free from pests and disease so that the plants may grow healthier and more quickly than plants grown in a medium.

Various aeroponic and hydroponic growing systems and methods are known in the prior art. With regard to aeroponic systems, U.S. Pat. Nos. 8,533,992 and 8,782,948 describe aeroponic systems that exemplify the prior art. The term "hydroponic" refers to the growing of plants using mineral nutrient solutions, typically in water, without soil. Plants may be grown with their roots directly exposed to the mineral solution only, or exposed to solution combined with an inert medium, such as perlite, rock wool or gravel, volcanic rocks and the like.

Aeroponic and hydroponic techniques have proved very successful in carefully controlled laboratory environments, for example, in environments relating to the study of plant physiology. However, due to challenges in the art, aeroponic and hydroponic techniques have yet to be considered feasible for mainstream production of crops or for adaptation on a wide, commercial scale. Moreover, such systems do not provide for the control and management of different sections of a single plant, which in turn provides for more effective control of productivity and growth efficiency relating to single plants and therefore crops overall. Still further, such prior art systems are typically stationary and not amenable to portability and the advantages that derive from portability, including new market models for growing, distribution and selling of a given crop or plant product.

Challenges in the relevant art include providing scalable growing systems that may be readily adapted to the requirements of different plants and which may provide for increased control and management of a single plant and therefore increase the production (yield), improve the product assortment available from plants, and increase the useful productive life of plants.

Other challenges in the relevant art include providing growing systems that are efficient and productive such that the energy costs associated with operation are justified by the output produced.

Yet another challenge in the art is to provide systems that offer diverse and highly tailored control over plant growth and which are easy and relatively inexpensive to manufacture, install, operate and maintain.

SUMMARY OF THE INVENTION

According to one aspect, a growing system includes a number of modular growing chambers each of the grow chambers being adapted to interconnect with one another to form a grow chamber stack. Each grow chamber is also adapted to at least partially enclose and provide a controlled growth environment for a respective section of a plant when the grow chamber is positioned in the grow chamber stack, and each grow chamber is adapted to permit selective removal from the grow chamber stack. As used herein, the term "adapted to" means that a component includes structure which enables the component to achieve a stated function, such as interconnecting with another component.

The stack of chambers may surround a growing plant within, with each growing chamber surrounding a corresponding portion of the plant, such as a root mass, plant produce, plant stalk, plant canopy, etc. The grow chambers may be selectively added or removed during plant growth, with little to no disruption to the plant, such that different sections of the growing plant may be influenced differently by respective surrounding grow chambers and the aeroponic and/or hydroponic features housed therein. The grow chamber configurations may thus be utilized to manage and control plant growth, productivity, harvesting and prolong the productive life of the plant, thus enabling unique growing and harvesting methods and processes.

According to another aspect of the disclosure, a number of unique processes for growing and harvesting a crop are facilitated by the modular grow chamber features of the grow systems. According to these unique processes, the grow chamber stack may be modified during plant growth by adding or removing grow chambers to accommodate and influence plant growth and production. According to one of these unique processes, referred to herein as a process for producing assorted product from a single plant for simultaneous harvest, the grow chamber stack is modified, as the plant grows, such that the system produces an assortment of produce of different sizes, all of which may be harvested at the same time. For tubular cultivars, such as potatoes, the modular chamber features may be used advantageously to facilitate the simultaneous harvest of different sized, different maturity vegetables, which may include tubers (i.e., potato starts), small sized potatoes, medium-sized potatoes, baker-sized potatoes and king baker sized potatoes, from a single plant. Thus, the modular chamber structure permits an assortment of produce sizes and types (i.e., tubers and potatoes) to be harvested from a single grow chamber stack simultaneously.

According to another aspect of the disclosure, the modular grow chambers facilitate a unique process for producing an extended harvest of a desired size product from a single plant. According to this aspect, the modular chamber features provide for the harvest of a desired size or type of produce, i.e., king baker sized potatoes, from a single plant, for an extended period of time compared to the prior art. According to this aspect, the grow system is first developed by adding grow chambers and modifying the plant such that respective number of different grow chambers having different maturity desired size product are developed. When product in a first chamber (bottom chamber for tubular crops such as potatoes) reaches a desired maturity level, the desired size product is harvested from the first chamber. That chamber is removed and the product in the next higher chamber is allowed to mature for a period of time until it reaches the desired size/maturity. Then, that chamber is harvested. According to this aspect, the plant's production cycle for a given size of produce may be extended by a number of weeks, months or years. In this regard, the grow system is utilized to influence or otherwise manipulate and/or control plant production to achieve appropriate quantities and timing for market demand.

According to another aspect of the disclosure, the modular chamber structure may be used to facilitate a process for extending the productive life of a plant and provide for multiple, continued, and perpetual harvest. This method allows for the plant to continue to grow and produce for a time that is significantly beyond what is typically attainable in the prior art, and, in the case of tubular cultivars such as potatoes, without the need to begin with a new seed, clone, cutting or tuber and the like. This process may involve the removal of a chamber from the grow chamber stack. This allows the plant to continue to grow its natural way and keep any harvest schedule desired. For example, if one wanted to harvest just baker-sized potatoes using this process, after the desired baker size is attained in the lowest chamber, the chamber is removed. Next, the plant portion continues to grow and then another chamber is added over the plant. The lid is then installed on the top chamber. As an example, the plant leaves below the lid are cut, leaving the leaf stem in place to stimulate and promote root growth and to maintain the two distinct growing environments. After the lower chamber has the desired baker size, the process is repeated. Using this process, the productive life of the plant for a given size product (or for assorted size products), may be extended.

According to another aspect, particular configurations of modular grow chambers are provided to enhance the effectiveness of aeroponic and hydroponic growing techniques.

According to another aspect, lifting or conveying features and support features for the grow chambers are provided to enable an operator to add grow chambers to the grow chamber stack and to remove grow chambers from the grow chamber stack.

According to another aspect, the modular growing chambers may include nesting or interlocking features to enable successively stacked chambers to be stacked relative to one another and provide structural stability to the grow system.

According to another aspect, the modular grow chambers may include integrated water and nutrient delivery systems, such as spray heads or nozzles and water delivery tubes being integrated into or within the chamber walls. Quick connect fittings may provide for easy attachment of the water and nutrient delivery system features of each chamber. Additionally, other past, present or future plant growth enhancement/manipulation treatments or techniques can be delivered via the grow chamber support structure and quick connect fittings both dependently and independently to any chamber and plant section for particular crops or even as a given plant enters different stages of growth. Examples are carbon dioxide, minerals, flavorings and the like.

The grow cabinet may be provided with portability features, such as wheels provided on portions thereof. In conjunction with the quick connect and disconnect features, the grow cabinet may be easily transported to different locations. Thus, harvesting from the grow cabinet may occur "on the fly" where the grow cabinet remains in a given location and potatoes are harvested from the chamber/cabinet periodically (monthly, weekly or daily), or harvesting may occur at a remote location, such as a harvesting station, where the entire cabinet is moved to a new location where produce is harvested. Or it can be temporarily removed for harvesting and subsequently returned to a grow station for continue production of a desired crop. Or it could be temporarily removed for harvesting to a harvest station where selective product harvesting can occur, with subsequent plug-in at the original or different grow location. Portability also enables unique marketing features, such as allowing the plant to mature in one location and then moved to a marketplace environment, such as a supermarket, where customers may select and harvest produce from the plant itself. Or, the systems could be installed in supermarkets, prisons, restaurants, commercial residential buildings or anywhere desired by the reseller/user.

According to another aspect of the disclosure, the grow system may be provided as a portable unit that may be readily moved, for example, from a grow area to a harvest area. The interlocking structure of the modular chambers provides stability in the grow system. The grow system water, nutrient, mineral, carbon dioxide, flavoring, or any other past, present or future plant manipulation/enhancing factor connections can be established or disconnected. Wheels and a carriage structure may be provided to enable a user to readily move the grow cabinet from one place to another, such as from a grow room where energy sources are provided, to a harvesting station, or to a sterilization and/or cleaning and maintenance area, or the like.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

FIGS. 8.1-8.3 are perspective views, which illustrate the insertion and lowering of a top grow chamber in an example grow system according to an aspect of the disclosure.

FIGS. 9.1-9.5 are perspective views, which illustrate the lowering and removal of a bottom grow chamber in an example grow system according to an aspect of the disclosure.

FIGS. 12 and 13 are perspective views of a grow chamber according to an aspect of the disclosure.

FIG. 14 is a perspective of a grow system with an example nutrient distribution and drainage system according to an aspect of the disclosure.

FIGS. 17.1 and 17.2 are sectional views showing an example chamber cover and a chamber cover fastening configuration according to an aspect of a disclosure.

FIGS. 19.1-19.6 are sectional views of an example grow chamber with an inserted stalk sealing member, stalk cutting blade and stalk aperture sealing member according to aspects of the disclosure.

FIGS. 20.1-20.3 are cutaway views of an example grow chamber showing an inserted stalk sealing member, cutting blade and stalk aperture sealing member, respectively.

FIG. 22 is a perspective view of an ebb and flow configuration for a grow system according to an aspect of the disclosure.

FIGS. 23.1-23.5 are schematic illustrations of a method of using a grow system according to an aspect of the disclosure.

FIGS. 24.1-24.5 are schematic illustrations of another method of using a grow system according to an aspect of the disclosure.

FIGS. 25.1-25.5 are schematic illustrations of another method of using a grow system according to an aspect of the disclosure.

FIGS. 26.1-26.5 are schematic illustrations of another method of using a grow system according to an aspect of the disclosure.

FIG. 35 is a cutaway perspective of a grow chamber according to an aspect of the disclosure.

FIGS. 37.1 and 37.2 are plan views of a portable lift mechanism in a grow system according to an aspect of the disclosure.

FIGS. 38.1 and 39 are perspectives of a third example grow system according to aspects of the disclosure. FIG. 38.2 is a detailed view as indicated in FIG. 38.1.

DETAILED DESCRIPTION

Figure 2:
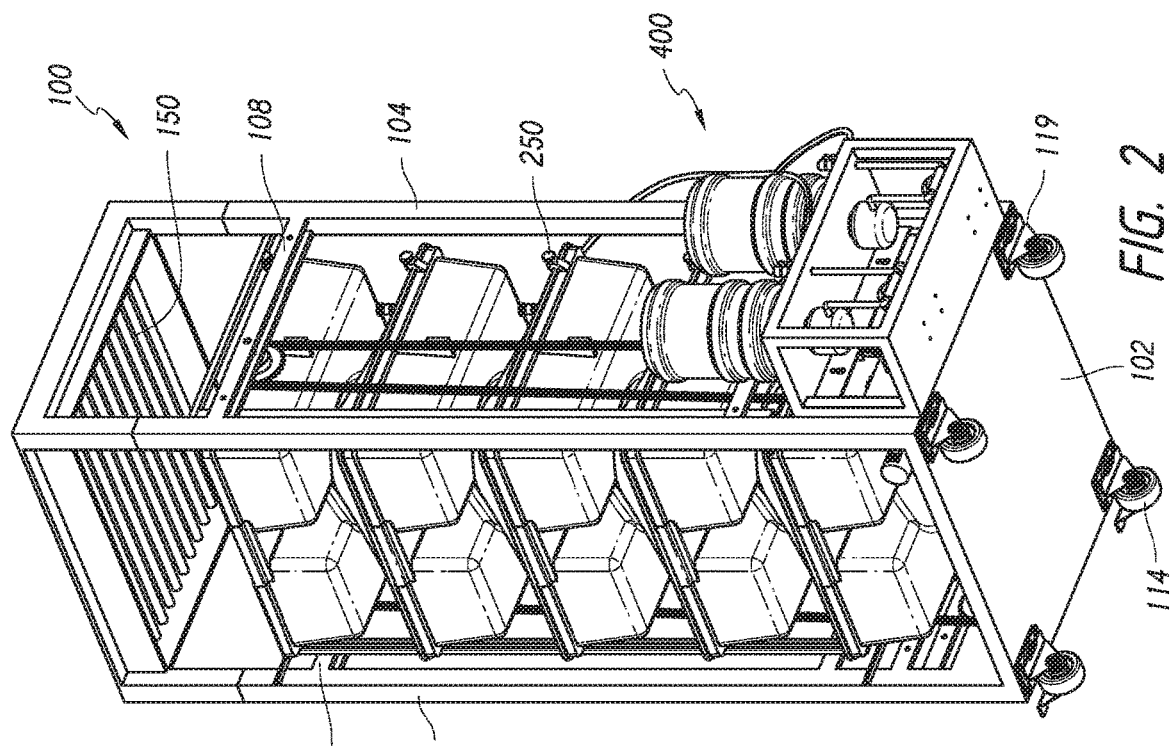
FIG. 2 is a perspective view of an example grow system according to an aspect of the disclosure.
Figure 1:
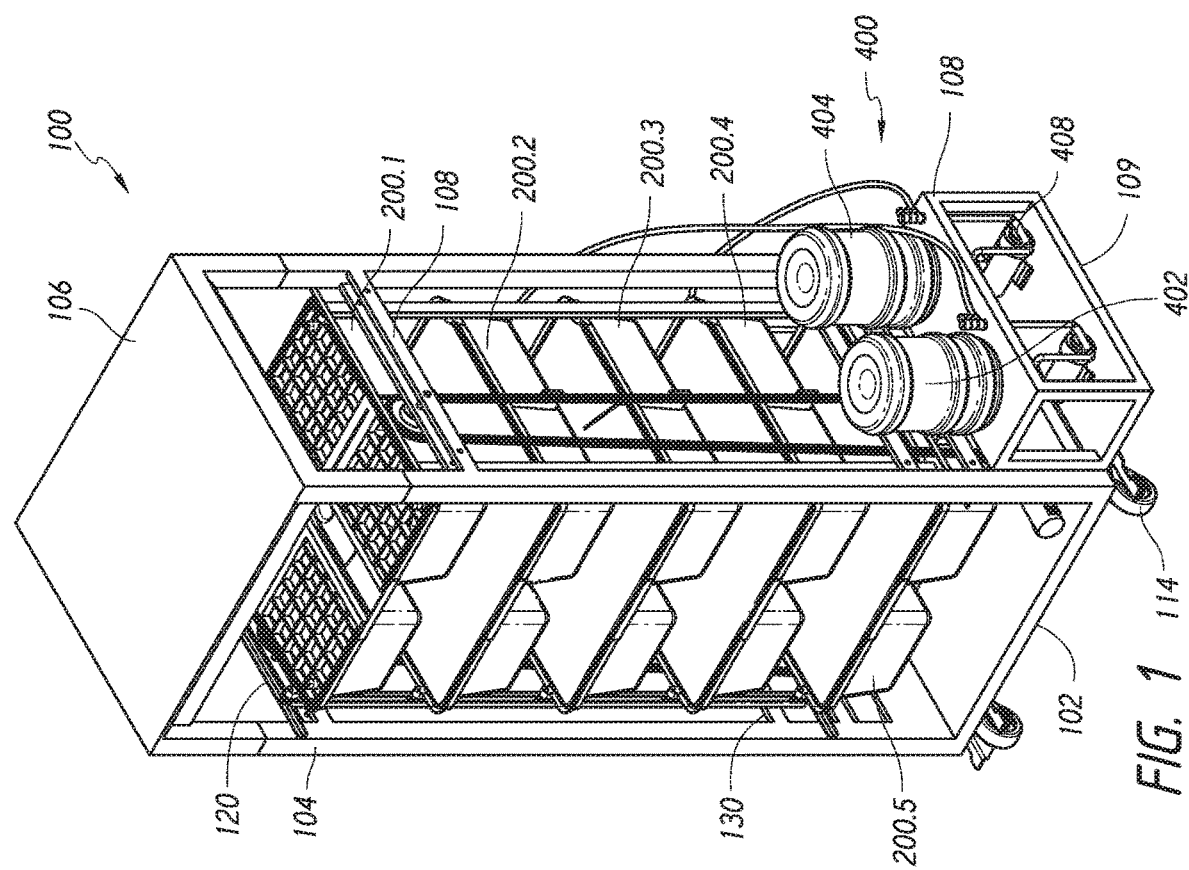
FIG. 1 is a perspective view of an example grow system according to an aspect of the disclosure.

FIGS. 1-9.5 illustrate details of an example growing system 10 according to an aspect of the disclosure. The grow system 10 may include the major components of a grow chamber support structure or cabinet 100, housing and supporting a number of stacked grow chambers 200.1-200.5, a chamber conveying system 300, and a water and nutrient circulation system 400. A light/energy source 140, which may be a metal halide light source, high pressure sodium, LED sunlight or other light/energy source appropriate for supporting growth of the plant canopy (not shown) above the top grow chamber 200.1.

Figure 5:
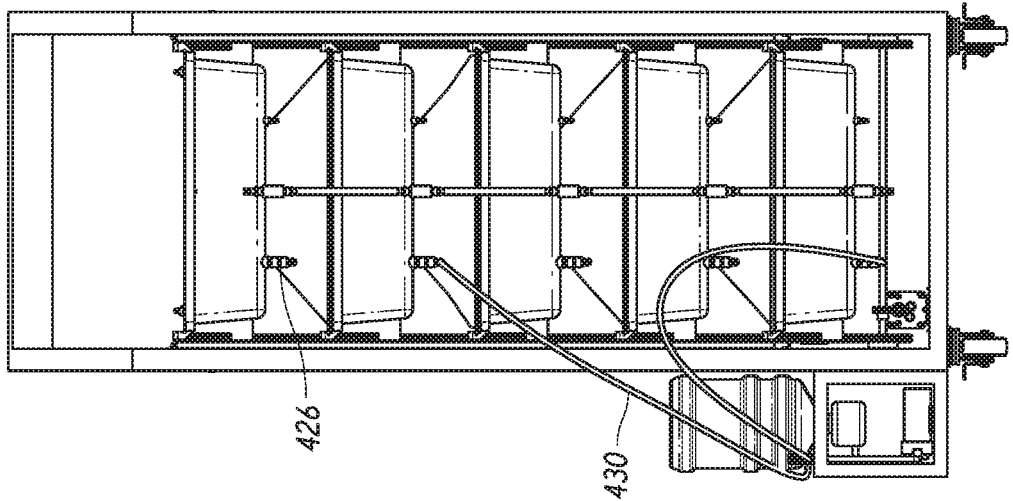
FIG. 5 is rear side view of an example grow system according to an aspect of the disclosure.
Figure 4:
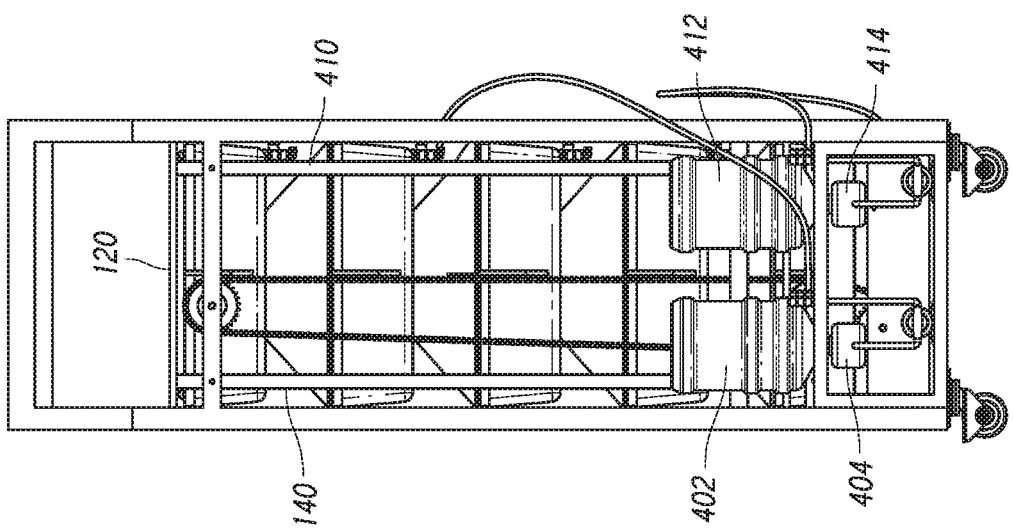
FIG. 4 is a left side view of an example grow system according to an aspect of the disclosure.
Figure 3:
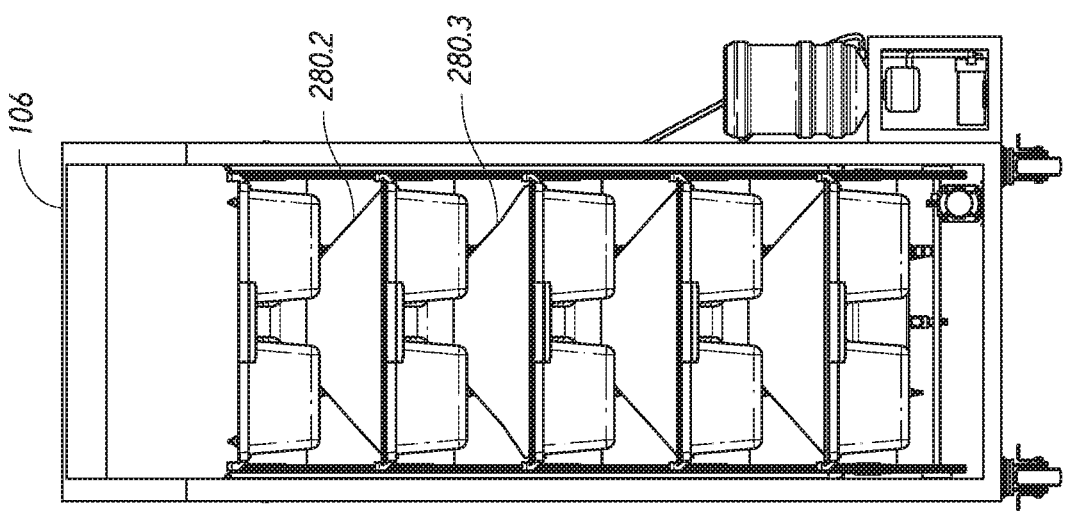
FIG. 3 is a rear plan view of an example grow system according to an aspect of the disclosure.

Referring additionally to FIGS. 3-5, an example grow cabinet 100 may include a generally rectangular frame including a base 102, four vertical posts 104 and a top member 106 and may be constructed of a lightweight yet strong material such as aluminum. Reinforcing transverse beams 108 may extend between the vertical posts 104 for added strength. Cabinet 100 may also include an additional shelf or support platform 109 for supporting components of the nutrient circulation system 400, including water reservoir 404 and nutrient reservoir 402, as well as pumps 406. With regard to the description herein, the side of the cabinet 100 that is facing front left in FIG. 1 will be referred to the rear side of the cabinet 100. The top member 106 (See FIG. 7) may be removably mounted on the vertical posts 104 using telescoping fittings, which enable the removal and or extension of the top member 106. More specifically, extension members may be inserted to raise or lower the height of the top member 106 to accommodate plant canopy growth of varying degrees. The cabinet 100 may be provided with portability features, such as casters 110 mounted to the bottom of the frame. In addition, load sensors or load cells 112, or other weight measuring or sensing devices, may be included in the caster mounts to monitor the overall weight and/or balance of the grow cabinet 100.

According to another aspect, the cabinet 100 may be provided with additional portability features, such as handles being provided on the grow cabinet. In conjunction with quick-connect fittings for the water supply, and the lightweight construction attainable from the modular cabinet design, the cabinet may be easily transported to a location that is remote from the growing environment. For example, the grow cabinet may be moved to a harvesting station in a processing plant. Alternatively, as a further example, the entire grow cabinet itself may be transported to or installed in a marketplace environment (i.e., supermarket or grocery store) to enable customers to personally harvest from the selection of different sized produce available from the single plant grown in the cabinet. The marketplace may be equipped with water supplies that may be quickly connected to the grow cabinet to keep the produce fresh and watered and to prolong product shelf life. Additionally, portability features allow for restaurants, prisons, commercial and residential buildings, farms, and the like, to install for consumption/resale, etc.

Figure 7:
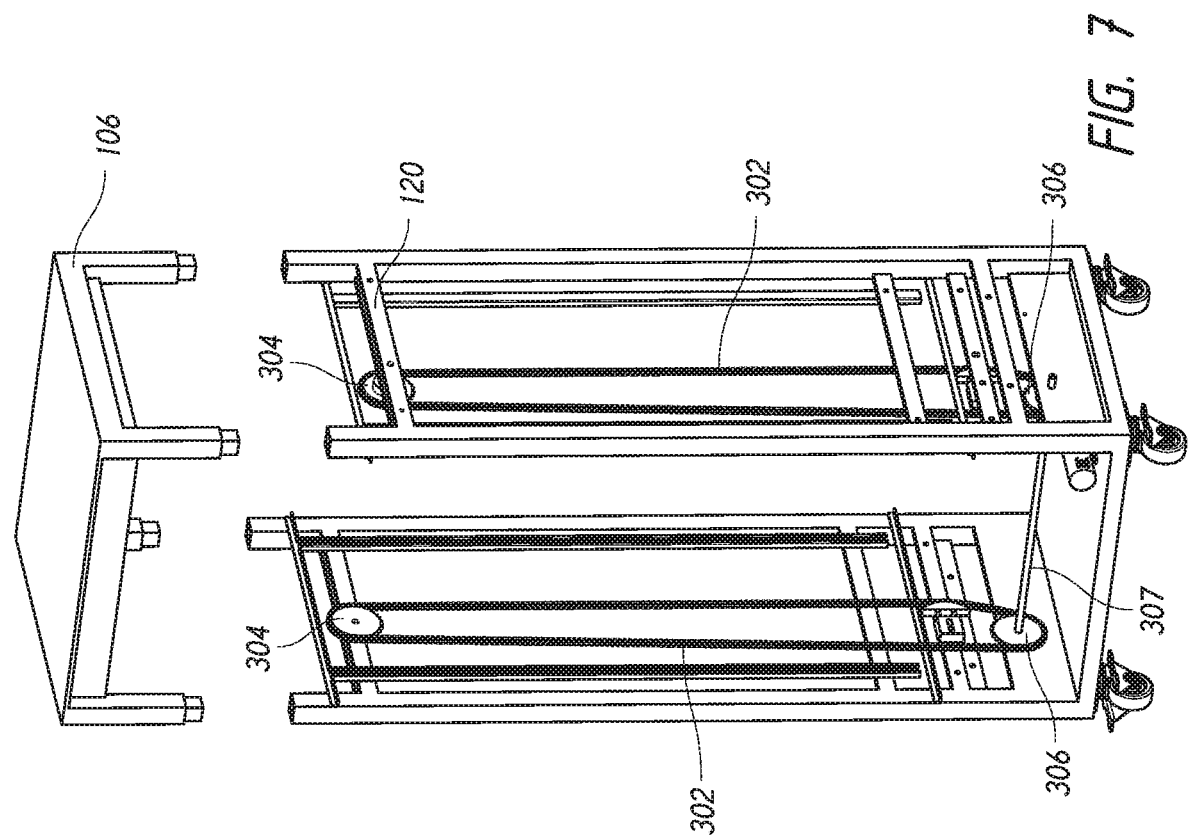
FIG. 7 is a perspective showing an example removable top portion of a grow system frame according to an aspect of the disclosure.
Figure 6:
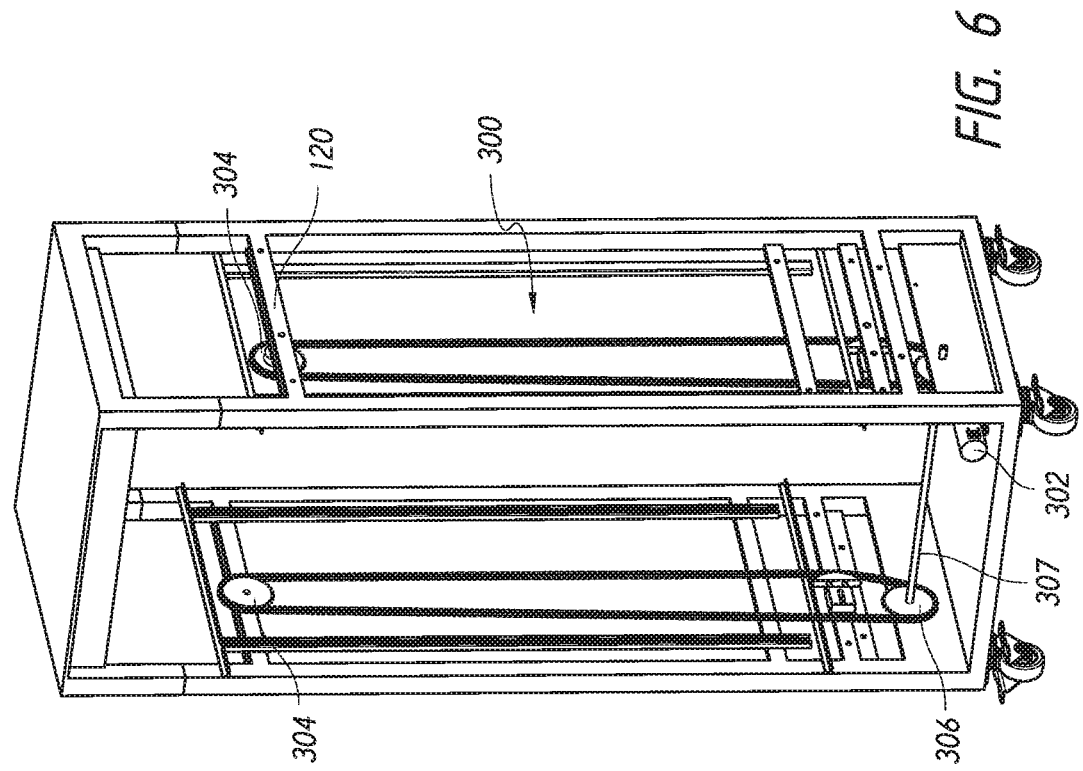
FIG. 6 is a perspective showing an example grow system support frame and conveyor system according to an aspect of the disclosure.

Referring additionally to FIGS. 6 and 7, the chamber conveying system 300 may include a pair of chains 302, which engage respective top sprockets 304 mounted on bearings in transverse beams 108 for rotational movement, and lower drive sprockets 306 mounted on a drive shaft 307 mounted for rotational motion on the cabinet frame. Drive sprockets 306 may be driven under power of an electric motor 308 using known implements, such as a worm gear and transmission to rotate drive sprockets 308 with suitable torque. Alternatively, a hand crank mechanism may be used in place of the electric motor 308. The chain drive system provides for the controlled lowering (or raising) of the grow chambers 200, as will be described.

To facilitate the rolling support of the grow chambers 200, and to thereby permit the same to be installed into, or removed from the cabinet 100, cabinet 100 may include top rail members 120 and bottom rail members 130. These rail members receive grow chamber rollers 250 (FIG. 2), which are mounted on each grow chamber. On each side of the cabinet 100, a pair of vertical rails 140 (FIG. 4) extend between the top rail members 120 and bottom rail members 130. These vertical rails receive respective chamber rollers 250, when the chamber is rolled to a fully installed position to enable the chambers to be conveyed in a downward vertical direction. Each chamber 200 is provided with a pair of toothed members 240 (FIG. 2), which engage the chains 302 when the chamber is inserted to an installed position to thereby provide for support of the grow chamber 200 for controlled lowering via the conveyor system 300.

Installation of a top grow chamber is depicted more specifically in FIGS. 8.1-8.3. In FIG. 8.1, chamber 200 is shown in a partially installed position, where the front-most rollers 250 are supported on top rails 120. Toothed members 240 are not yet engaged with chains 302. As an operator moves the chamber 200 further into the cabinet 100, the chamber reaches the installed position shown in FIG. 8.2. Here, toothed members 240 engage chains 302 to support the weight of the grow chamber thereon. In this position, the rollers 250 are aligned with the vertical rails 140. FIG. 8.3 depicts the chamber 200 in a lowered position, resulting from the movement of chains 302. As will be recognized, this example grow system facilitates the addition of successive grow chambers 200 in a stacked arrangement to accommodate and influence plant growth in processes as will be later described herein.

Removal of lower grow chambers is depicted in FIGS. 9.1 thru 9.5. For clarity, these figures illustrate only a lowermost grow chamber 200. It will be understood by those of ordinary skill in the art, that typically, a number of additional grow chambers would be disposed above the bottom grow chamber 200 as required by a particular growing process, as will be explained in more detail herein. Chains 302 are held in a particular orientation using a spring tensioning mechanism 320, which maintains the chain in a particular vertical path as it travels, such that the toothed members 240 on the grow chambers 200 remain engaged throughout the downward travel. This is shown in FIGS. 9.1 and 9.2. As the grow chamber 200 continues movement downward, it reaches the position shown in FIG. 9.3 in which the toothed members 240 disengage from the chains 302. In this position, rollers 250 have also traveled downward beyond the extent of the vertical rails 140 to a position in which they rest upon lower horizontal rails 130. To this end, tensioning mechanism 320 and the displaced orientation of drive sprockets 306 relative to the tensioning mechanism 320, provide for the chain to displace sufficiently from the vertical path to disengage from the toothed members 240 as the bottom chamber 200 approaches the removal position. Thus, grow chamber 200 may be removed from the cabinet 100 by an operator, who may roll the chamber 200 out of the cabinet, as rollers 250 roll on lower rails 140, to positions shown in FIGS. 9.4 and 9.5. Upon removal, the contents of the chamber 200, which may include harvestable produce, may be further processed, as will be described. Details of example grow chambers 200 according to an aspect of the disclosure will now be described.

Details of an example grow chamber 200 are illustrated in FIGS. 10-20.3. A grow chamber base 210 may have a generally U-shape or horseshoe shape, such as a square or rectangular shape with a with slot or recess 213 provided therein. Slot or recess 213 accommodates a central portion, such as a stalk, of a plant being grown within the grow cabinet 100 and permits installation of a grow chamber around a section of a growing plant stalk, as will be further explained. The grow chamber may include a substantially planar bottom wall 212 and substantially planar side walls 214 and front wall 216 and a pair of rear walls 220. The bottom wall may be contoured such that liquid that collects on it may gravitate towards a central or rear point where a drainage outlet 420 (FIG. 13) is located. A central raised apron portion 218, which may be conical, extends upwards from the bottom wall 212. Apron portion 218 may extend upward into the chamber in varying dimensions (height and width) and varying shapes as appropriate for a given type of plant and to provide a desired amount of space for plant production within the chamber. A pair of slot sidewalls 222 extend from the rear walls 220 to the apron portion 218. Slot or recess sidewalls 222 include a respective slot 226 (FIG. 10) for receiving a cutting blade or sealing member 228, which further seals the plant stalk against light and/or contamination, as will be further described. As will be recognized, the chamber base 210 may be formed using methods such as injection molding to provide for smooth surfaces which provide for unhindered flow of liquids therein, as well as easy cleaning and low manufacturing costs.

Housed within the grow chamber are water and nutrient distribution conduits 422, which may be separate plastic tubing, or which may be formed integrally as part of the grow chamber base 210. In an aeroponic application, conduits 422 may be in fluid communication with spray nozzles 424 disposed in respective corners of the grow chamber base 210 for spraying nutrients on the root mass and/or plant section housed within the grow chamber 200. An inlet connection 426 (FIG. 13), which may include a quick-connect fitting, provides for input of water and/or nutrients from the main distribution system 400. As described previously, each grow chamber 200 includes a pair of toothed members 250 on respective side walls, which may be formed integrally therewith, for engaging the conveyor system 300 and supporting the grow chambers 200 during operation. Grow chambers 200 also include a number of roller mounts 230, which may be integrally formed with the chamber base 210 and which may include a housing for a bearing and shaft upon which rollers 250 are mounted.

Figure 10:
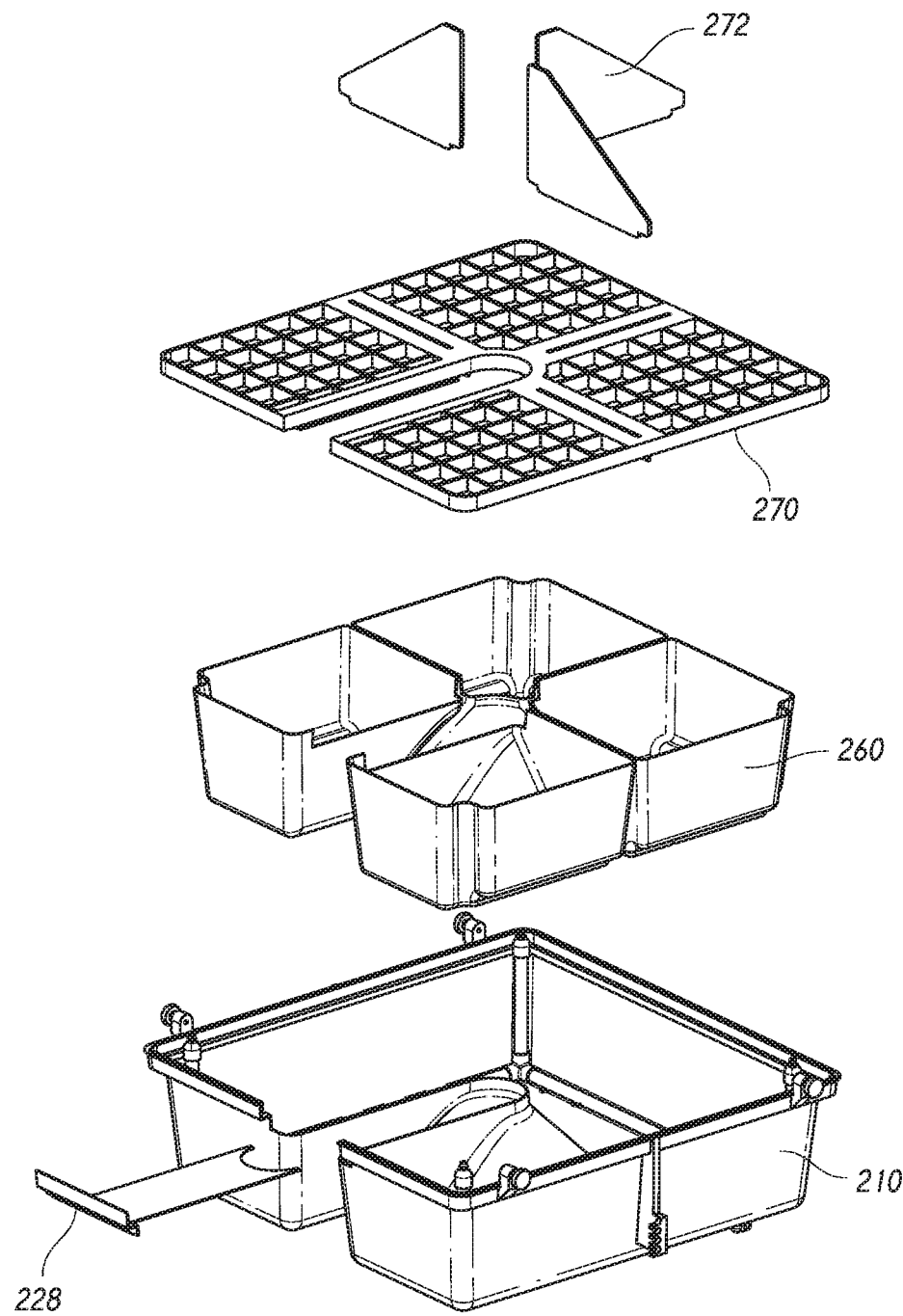
FIGS. 10 and 11 are perspective exploded views of an example grow chamber according to an aspect of the disclosure.
Figure 11:
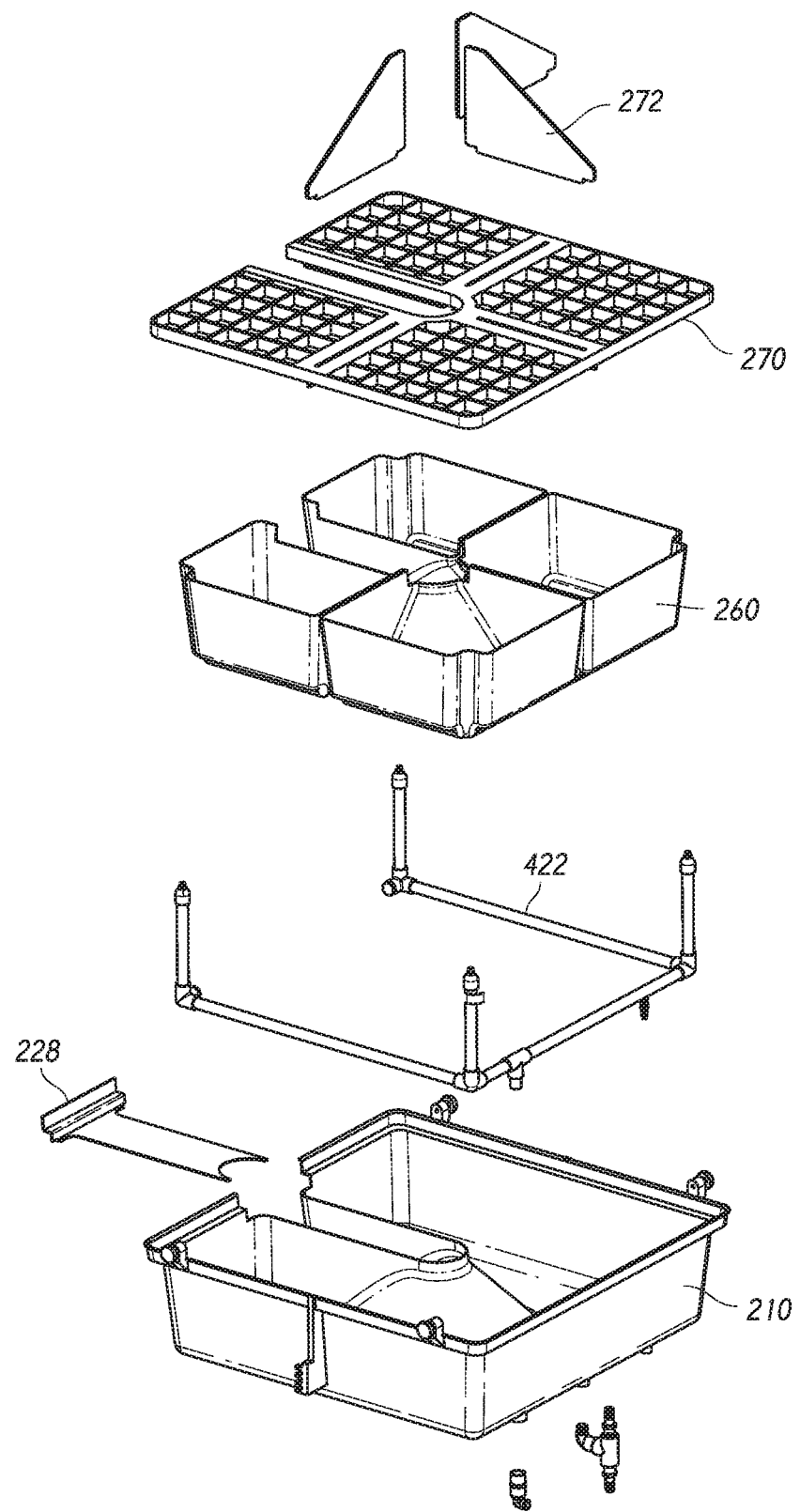
Figure 16:
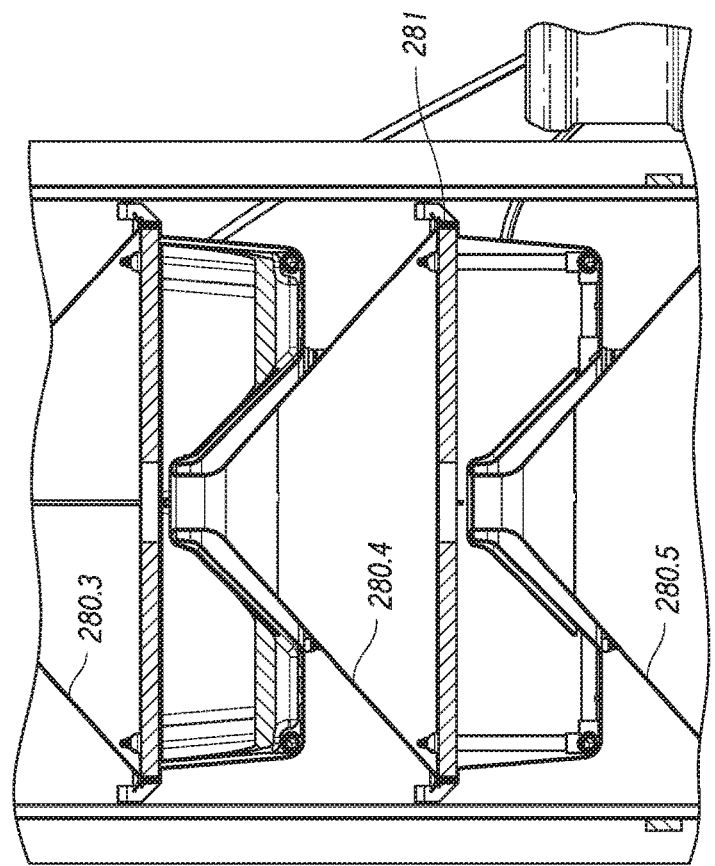
FIGS. 15 and 16 are sectional views showing an example grow chamber nesting according to an aspect of the disclosure.
Figure 15:
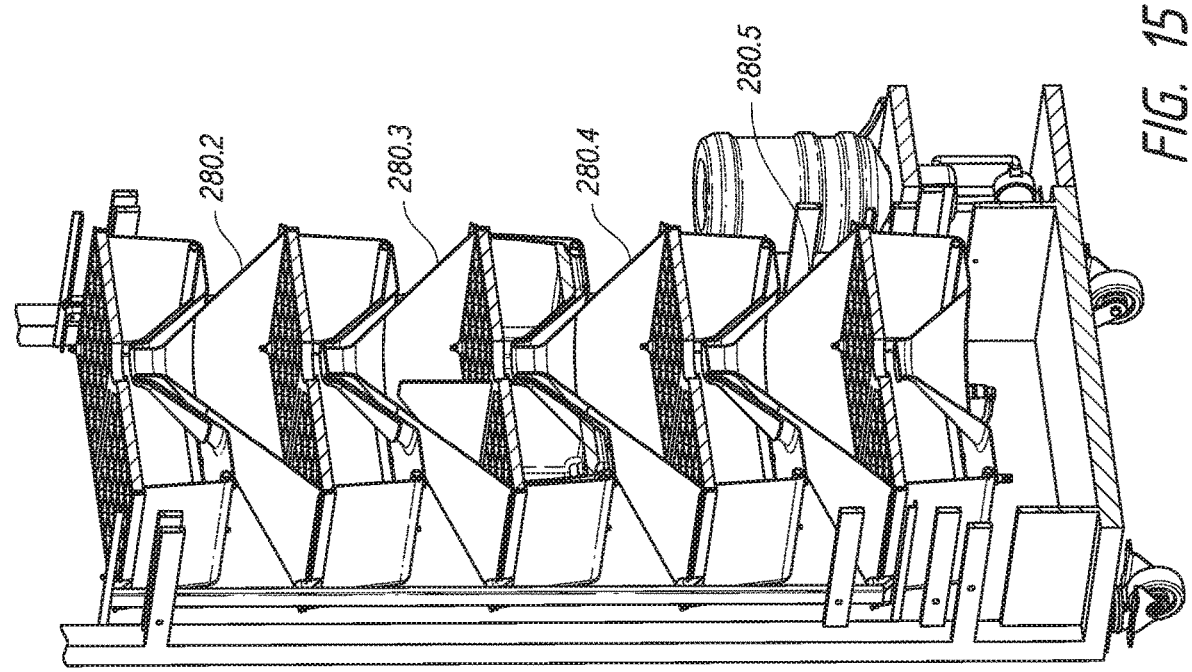
Figure 18:
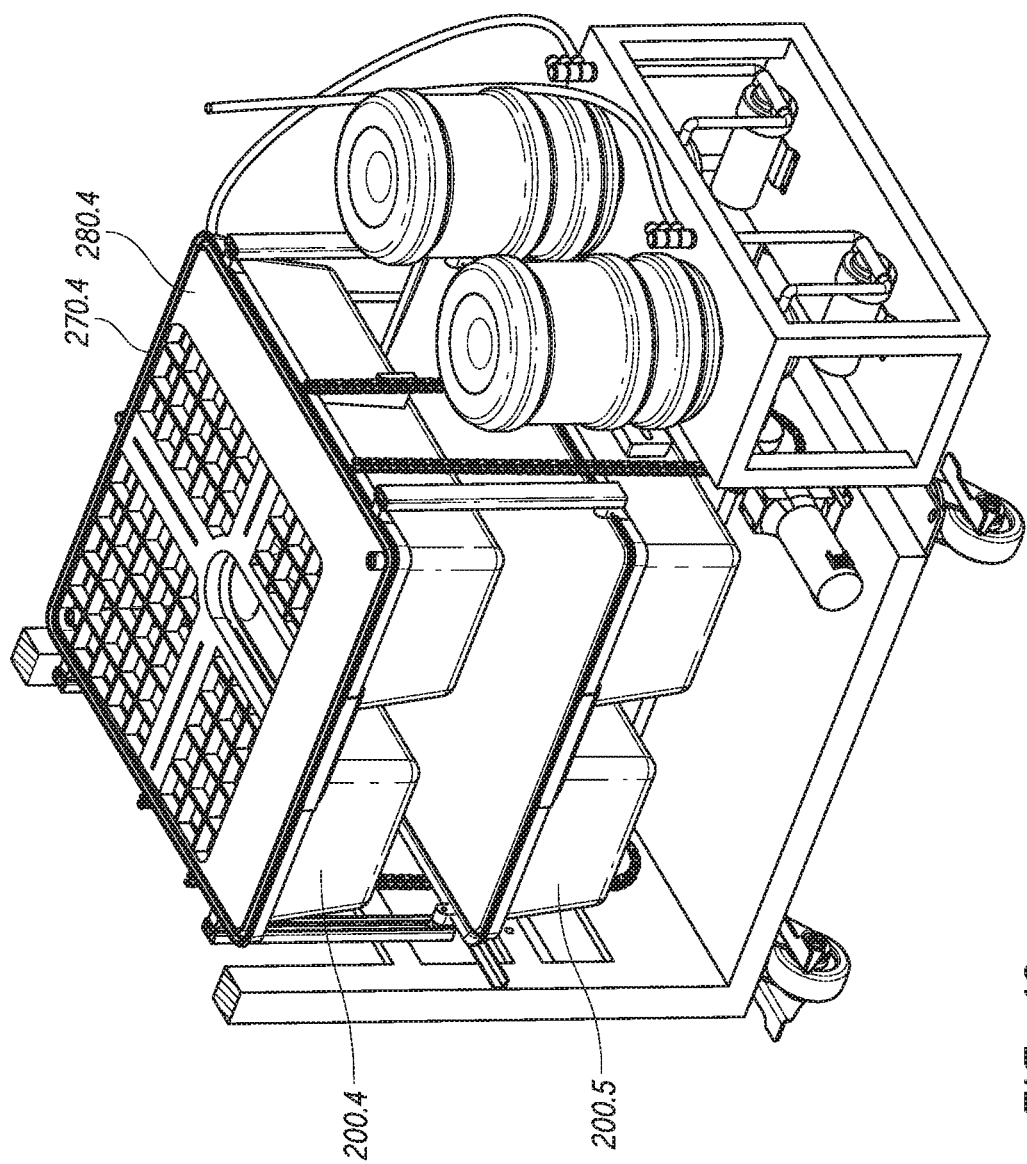
FIG. 18 is a cutaway perspective view showing a grow chamber according to an aspect of the disclosure.

Referring particularly to FIGS. 10 and 11, a partitioning insert 260 may be provided on the interior of the chamber base 210 and fitting in a nested fashion with respect thereto. The partitioning insert may further partition the interior of the grow chamber. A grow chamber support grate 270 may be mounted on a shoulder 272 formed in the tops of the chamber walls. Support grate 270 provides for the support of the root mass and/or plant fruit or vegetables, while permitting drainage of liquid from spray nozzles 424 to the bottom of the grow chamber 200. Support grate 270 may include slots for receiving upper partitions 272, which divide an upper area of the grow chamber and which support a grow chamber cover 280 (FIGS. 15-17) which may be a flexible plastic membrane, tarp or sheet for sealing the upper area of the grow chamber 200. Grow chamber cover 280 may be a generally square shaped sheet of polyethylene or other suitable plastic or metallized film, such as MYLAR™ or rubber sheeting, with properties for shielding the interior of the grow chamber from light, insects and other undesirable ambient conditions. Referring particularly to FIG. 17, the outer ends of cover 280 may be secured to the grow chamber base 210 with one or more retaining inserts 282 which are inserted into a space formed between the upper ends of the walls of the chamber base 210 and the outer surface of the support grate 270. Retaining inserts 282 may be used to force the outer portion 281 of the cover 280 into the space and to sealingly retain the cover 282 on the grow chamber base 210. The interior edge of the cover 280 may be gathered together around the plant stalk/trunk. When an additional chamber 200.4 (FIG. 17) is installed above the cover 280.5, the chamber 200.4 is installed around the gathered interior portion of the cover, with the chamber base recess 20 allowing insertion of the chamber around the gathered interior portion of the cover 280.5, which may be guided up through the conical apron portion 218.4 of the chamber base 210.4 above it and folded down around the apron portion 218.4. As can be seen in FIGS. 15 and 16, which are sectional views of a stacked arrangement of chambers 200.1 to 200.5, each chamber cover 280 provides a generally conically shaped, sealed area above its respective chamber base 210, which protects the interior of the chamber and the plant components therein. FIG. 18 is a cutaway view partially showing an installed cover 280. Cover 280 extends over the recess 213. Chamber cover 280 in combination with the grow chamber base shape, including the recess, provides structure by which the grow chamber is adapted to at least partially enclose and provide a controlled growth environment for a respective section of the plant. The collapsible nature of the cover and its removable connection to the chamber permits the cover to be removed from the chamber when removal of a grow chamber from the stack is desired. In this regard, the chamber cover provides structure that is adapted to permit selective removal of the grow chamber from the grow chamber stack.

Referring additionally to FIGS. 19.1-19.6 and 20.1-20.3, two types of sealing members, and a cutting member may be fit within the recess 212 to facilitate sealing of the chambers 200 or cutting of the plant stem in methods of using a system according to an aspect of the disclosure. For example, when a bottom chamber 200.5 (FIG. 1) is ready for removal, the flexible cover 280.4 on the chamber 200.4 above the bottom chamber 200.5 may be removed. Removal may occur by removing the outer edge of the cover including removal of the retaining inserts 282 (FIG. 17). Removal of the cover 280.4 provides access to the interior of the chamber above the bottom chamber so that the gathered flexible cover of the bottom chamber may be pulled down through the apron of the chamber above. A cutting blade 296 may be inserted into the recess 213 in the chamber above to sever the plant stalk. The cover of the bottom chamber is then retracted through the conical apron of the chamber above and pulled down through it. With the plant stalk/stem now severed, removal of the bottom chamber 200.5 may occur. A second sealing member may then be inserted into the remaining chamber 200.4 (where the plant stalk was severed) in place of the blade, to ensure that the chamber is sealed.

Referring to FIGS. 19.1, 19.2 and 20.1, a sealing member 228 may be inserted into the recess 213. Sealing member 228 may be provided with a cutout 292 on its end in order to accommodate the plant stalk/trunk. FIGS. 19.1 and 19.2 show inserted and retracted positions, respectively, of the sealing member 228. FIG. 20.1 shows a perspective cutaway of the sealing member 228 fully inserted. According to another aspect of the disclosure, a cutting blade 296, which has a sharpened end for severing the plant stalk, may be inserted into the recess 213 of a chamber to permit removal of a portion of the plant stalk and associated chamber. In this case the cover of the bottom grow chamber is retracted in a chamber to be harvested, i.e., the bottom chamber. Blade 296 travels within the slots formed in the chamber slot sidewalls 222 and severs the plant stalk as detailed in FIGS. 19.3 and 19.4. FIG. 20.2 shows a perspective cutaway of a chamber 200 with a cutting blade fully inserted. FIGS. 19.5 and 19.6 show a second sealing member 298, to be used after a plant stalk is severed.

Referring to FIGS. 4 and 14, example systems according an aspect of the disclosure may be provided with a water and nutrient delivery system 400. Nutrient reservoirs 402 and 412 may contain different respective nutrients or nutrient blends for particular grow system applications and plant types. Reservoirs 402 and 412 may be mounted within respective reservoir fittings 404 and 414, which sealingly engage the reservoirs 402, 412. Respective pumps 406 and 416 provide pressure differentials within the delivery system and may include output manifolds 418, which may include a number of quick-connect fittings for engaging flexible hoses that convey the liquid to respective chambers 200. Each grow chamber 200 is provided with a water and nutrient intake fitting 426 (FIG. 5) and a drainage/return fitting 420. These may be quick-connecting type fittings, as are known in the art. A number of flexible conduits or hoses 430 may be provided for selective connection to the manifolds and intake fittings 426 by an operator to deliver nutrients. Drainage fittings 420 may communicate with a common conduit to permit used nutrient mixture to be conveyed from the chambers 200 to a collection container or drained onto the floor of a facility where the grow systems are housed. Each grow chamber may be provided with a gas inlet port for enabling gas, such as carbon dioxide, to be introduced into the grow chamber to increase the concentration of this component and enhance plant growth.

As will be recognized, the example water and nutrient delivery system 400 provides a highly-configurable system for permitting an operator to ensure that proper nutrient mixtures are provided to each respective chamber 200. To this end, appropriate sensing elements may be provided on the interior of the chambers to sense relevant parameters, such as carbon dioxide levels and other nutrient levels, or contaminant levels, PH levels and temperature. Such sensors may communicate with a computer monitoring and control system (not shown) in a manner that is known in the art.

Figure 21:
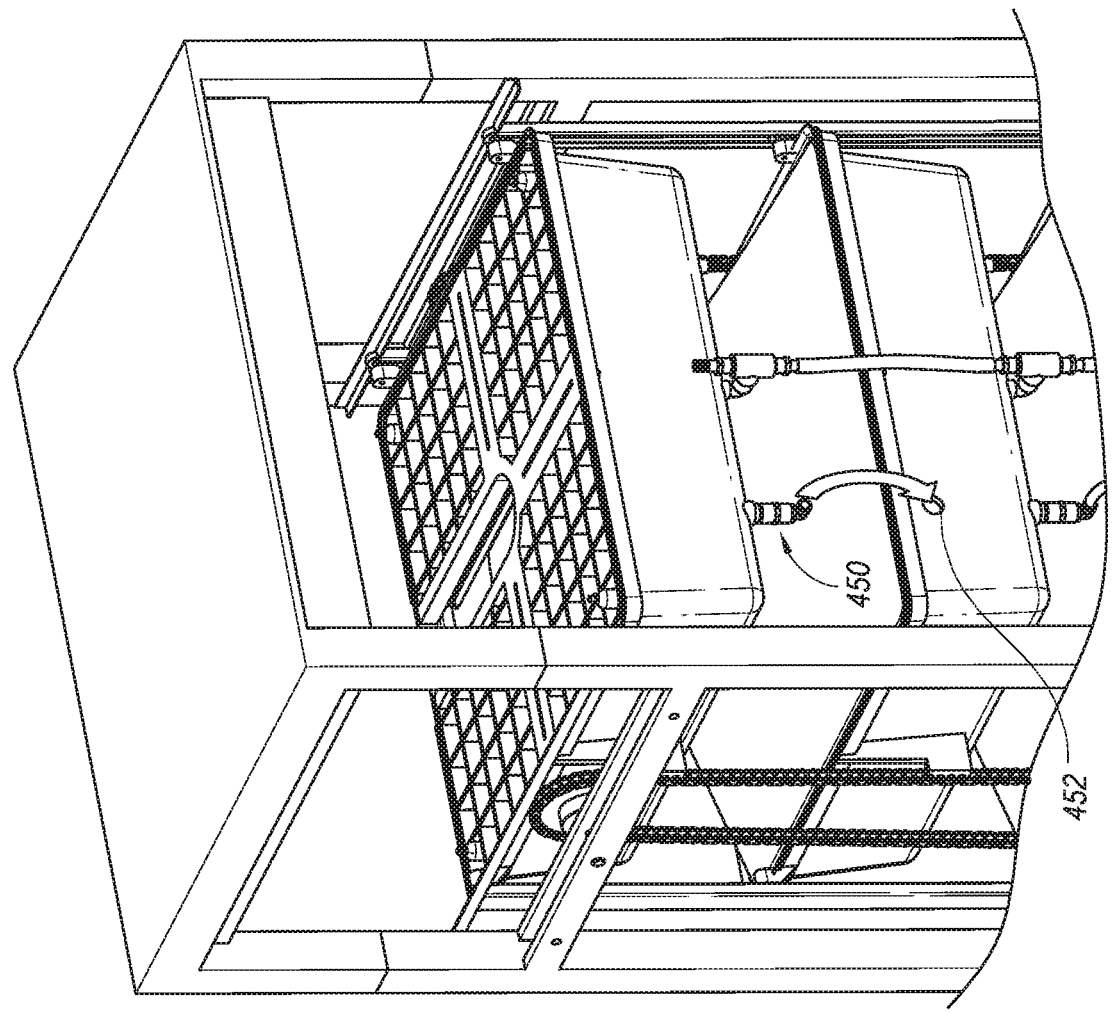
FIG. 21 is a perspective view of an example enclosure configuration for a grow system according to an aspect of the disclosure.

FIG. 21 illustrates a modified example water and nutrient delivery system, which may support an ebb-and-flow type growing process. Ebb-and-flow processes are an alternative to aeroponic processes for providing nutrients to growing plants. In ebb-and-flow processes, the grow chambers are provided with a supply of water and nutrients, which may flow into and pool within the bottom of each grow chamber to a predetermined level, for a given amount of time. The supply is then drained for a given time and then refilled with nutrients and water. This grow method is known in the art and is an alternative to aeroponic grow methods, which involve a mist being supplied to the plant roots. According to an aspect of the disclosure, ebb-and-flow processes may be implemented with a modified water and nutrient delivery system. More particularly, as shown in FIG. 21, the nutrient intake for an upper chamber may include a valve 450 and conduit 452 for conveying nutrients to a lower chamber. In this manner, ebb-and-flow processes can be achieved within the individual chambers. Alternatively, the valve 450 may drain to a waste area or container instead of draining to the lower chamber. Generally, each chamber may be irrigated and/or filled using either aeroponic components, such as spray nozzles, and/or hydroponic components, such as liquid dispensers or dispensing ports or orifices formed in conduits. Further, each chamber may be drained either to a lower chamber, via conduit 452, for example, or drained to a waste area (floor) or to an external reservoir. If a chamber is being filled for an ebb-and-flow application or technique, the chamber may be provided with a fluid level sensor or float switch to detect and maintain an adequate level of liquid in the container and to prevent over-filling Such sensors may communicate electronically with control components for nutrient distribution system pumps 406 and 416.

FIG. 22 illustrates a plant canopy enclosure, which may include panels 490 formed of a light reflective plastic, such as MYLAR™ with a reflective coating and fastened to the cabinet frame to reflect light within the cabinet, thereby resulting in higher amounts of light energy being utilized by the plant.

The example modular grow chambers according to aspects of the disclosure facilitate unique processes in the cultivation of plants, as will now be described. The grow cabinet may be modified during plant growth by adding and/or removing modular grow chambers to accommodate, influence, manipulate and control plant growth and production. According to aspects of the disclosure, at least three unique growing processes may be facilitated by the modular grow chamber cabinet system described above. These processes are: 1) a process for producing assorted product from a single plant for simultaneous harvest; 2) a process for producing an extended harvest of a desired size product from a single plant; and 3) a process for extending the productive life of a plant. For removed tubular cultivars, such as potatoes, the modular chamber features may be used advantageously to control harvest of different sized, different maturity vegetables, which may include tubers, small sized potatoes, medium-sized potatoes, baker-sized potatoes and king baker sized potatoes, from a single plant. Additionally, for tubular cultivars, the modular chamber features may be used to extend the harvest of a desired size product, such as king baker sized potatoes, and to extend the productive life of a plant such that the time period for which a given sized product (i.e., king baker sized potatoes) may be harvested is significantly extended compared to prior art systems and processes.

Process for Producing Assorted Product Sizes from a Single Plant for Simultaneous Harvest An example of an application of the modular growing chambers to facilitate plant growth modification/manipulation, and more specifically, to facilitate the production of assorted product from single plant for simultaneous harvest, will be described with reference to FIGS. 23.1 to 23.5. First, a desired tubular product is selected for growth in a first chamber 200.5 ("starter box") as shown in FIG. 23.1. For example, the starting product 50 may be a potato tuber, cutting or other plant start, including products that have been grown using the example systems and processes described herein. The starting product 50 may be supported on or within the support grate 270.5 of the first chamber 200.5 and provided with water and nutrient mist. Various devices, such as net-pots, or other inserts may be used to support the plant start within the chamber. Water enrichment may involve de-chlorination, pH adjustment, reverse osmosis, addition of appropriate nutrients and minerals, and the like. The tubular product 50 is preferably mounted in the support grate 270.5 and a cover 280.5 may be provided on the grate such that the bottom portion 54 of the product 50 is shielded from light and exposed to the water/nutrient supply sprayed from the nozzles in the first chamber 200.5, or, in the case of an ebb-and-flow system, flooded and drained with the water/nutrient mix. Alternatively, a specially adapted support grate, without apertures and including a cutout for supporting the starting product 50, and a recess for permitting removal, may be utilized. The top portion 56 is exposed to the light source (not shown in FIG. 23.1; see FIG. 2). After a period of time, roots 52 will begin to grow from the bottom portion 54.

Referring to FIG. 23.2, a plant stalk 58 will grow from the top portion 56 and plant product, such as potatoes, on a first production timeline will begin to grow from the roots in the first chamber 200.5. The apron portion 218.5 of chamber 200.5 provides for sealing against light and ambient/external environmental conditions around the root system and plant stalk. The chamber provides support to the growing potatoes. Referring to FIG. 23.3, at an appropriate time, the plant stalk 58 will reach a desired height and the maturity of the potatoes growing in the first chamber 200.5 will reach a desired level. At this point, leaves are cut from the plant stems within the second chamber 200.4 to stimulate root growth. Then, a second chamber 200.4 may be installed above the first chamber 200.5. As will be recognized, the recess 213.4 (FIG. 12, for example) in the chamber 200.4 facilitates installation of the chamber 200.4 around the plant stalk. The cover 280.4 is installed on the top of chamber 200.4 and the portion of stalk is then shielded from the energy source and begins to grow potatoes on a second production timeline. As the plant continues to grow, the potatoes in the first chamber 200.5 on the first development timeline will continue to grow and increase in size. The process of adding a chamber may continue, as shown in FIG. 23.4, where a third chamber 200.3 has been added to facilitate growing of a third portion of the plant on a third production timeline. As will be recognized, the process may continue until a desired number of production timelines are implemented for a single plant.

FIG. 23.5 schematically illustrates an example grow cabinet that is readied for simultaneous harvest of different sized produce. The grow cabinet may reach this state using the aforementioned process after a period of time—3 months, for example—to permit the plant production segments to grow, after which the grow cabinet can be harvested completely, yielding five categories of produce, each resulting from a respective production timeline for each portion of the plant. For example, tubers may be harvested from chamber 200.1, small potatoes from chamber 200.2, medium sized potatoes from chamber 200.3, baker sized potatoes from chamber 200.4 and king baker sized from chamber 200.5. As will be recognized from the foregoing disclosure, the example cabinet system described with respect to FIGS. 1-22 may be utilized to accomplish this process. More specifically, each of the chambers 200.5 thru 200.1 may installed and may later be lowered and removed from the grow cabinet in the manner described in order to harvest the respective contents in each chamber, yielding an assorted-size harvest. Thus, five different sizes/maturities of produce may be harvested at the same time from the grow cabinet, offering a selection of produce from the single plant.

It will be recognized by those of ordinary skill that the grow cabinet and process described above may facilitate other harvesting methods besides the "complete cabinet" harvesting described above. For example, produce may be harvested where produce is harvested from each cabinet at a different time, depending on a desired size or type of produce. In this case, grow chambers that are empty of product following harvesting may be removed to promote the growth of product in other chambers that are not yet harvested.

Process for Extending the Harvest of a Desired Size Product from a Single Plant

FIGS. 24.1-24.5 schematically illustrate steps of using a modular grow chamber system in a process for extending the harvest of a desired size product from a single plant, according to aspects of the disclosure. According to this process, product is first grown within the grow cabinet, such as described above with respect to 23.1 to 23.5, with each of a number of modular chambers having maturing product according to a different timeline. The grow cabinet will thus attain a harvesting state as illustrated in FIG. 24.1. However, in contrast to the "total" harvesting performed according to the previously described process, harvesting according to this process occurs in stages, as the product in each chamber matures to a desired size. More specifically, referring to FIG. 24.1, a first, lowermost chamber will have the desired king baker-sized, (size denoted S5 in FIG. 24.1) potatoes ready for harvesting and shown harvested and removed from chamber C5. The product in that chamber C5 is harvested, leaving the root mass (RM) therein as shown in FIG. 24.2. The root mass (RM) is then removed and the empty chamber removed from the stack. Removal of the root mass and product promotes growth of product in the remaining chambers. Next, referring to FIG. 24.3, after the product in chamber C4 matures from size S4 to the desired size S5, for example, after two weeks, the S5 size product is harvested from chamber C4, leaving a root mass (RM) therein as shown in FIG. 24.4. In addition, during this period, the product in chambers 3, 2 and 1 have matured to larger sizes, S4, S3 and S2, respectively. At this point, the same chamber harvesting process is repeated, with the root mass and product removed from chamber C4 and chamber C4 removed from the stack as shown in FIG. 24.5. Then the process is repeated for chambers 3, 2 and 1 after additional periods (i.e., two-week periods). In this manner, the harvest time for king baker sized produce, for example, may be extended i.e., over a 10-week period, for a single plant.

Process for Extending the Productive Life of a Plant

FIGS. 25.1-25.5 illustrates a process of using modular grow chambers for extending the productive life of a plant according to aspects of the disclosure. This process is similar to the process of extended harvest described above. However, in this process the modular growth chambers according to aspects of the disclosure are utilized to foster additional growth in the plant stalk as part of the process. Generally, once the plant is mature enough to yield product of a desired size or type in a given grow chamber, that chamber may be harvested, the root mass and product therein removed, and the chamber removed to promote growth of additional produce in the chambers above it, as described above in reference to FIGS. 24.1-24.5.

The process of extending the productive life of the plant according to aspects of the disclosure may involve the step of cultivating the plant stalk following the harvesting of some or all chambers in the cabinet, or alternatively, as an added step after each chamber is harvested in the process described regarding 24.1-24.5. According to a first process of cultivating the plant stalk after all chambers have been harvested, once the chambers are depleted and the stack reduced down to a single chamber, as shown in FIG. 25.1, the process of re-developing and thereby extending the plant production may occur. Referring additionally to FIG. 25.2, according to this process, a portion of the plant stalk 58 is stripped of its leaves. Then, as shown in FIG. 25.3, an additional chamber (CA) is added on top of the stack, surrounding the stripped plant stalk section 58 and isolating it from the light source. This will result in the plant stalk section 58 growing upward towards the light source and also producing roots, and eventually tubular product (potatoes, etc.) within the newly added chamber CA, indicated by S1 in FIG. 25.3. In addition, the product in chamber C1 has now matured to a larger size, S2. Once the new stalk section, 58 (FIG. 25.4) begins to develop roots/product, an additional stalk section above may be stripped of its leaves, and a second additional grow chamber added as shown in FIG. 25.5. This process may be repeated to cause a number of sections of the plant stalk to be controlled and cultivated for production. Then, harvesting may take place as the produce in each chamber matures.

FIGS. 26.1-26.5 illustrate an alternative process for extending the productive life of a plant according to an aspect of the disclosure. According to this aspect, a new chamber is added to the cabinet stack after each harvesting step and corresponding removal of a single lowermost chamber from the stack. Referring to FIG. 26.1, after a harvesting step of harvesting product of size S5 from a lowermost chamber C5, as explained with regard to FIG. 24.2, for example, the lowermost chamber is removed and the root mass trimmed. Referring additionally to FIG. 26.2, the plant stalk is trimmed of its leaves and, as shown in FIG. 26.3, a new chamber CA is added to the top of the stack, with the plant stalk being housed therein and insulated from the light source. The plant continues to develop, with the stalk growing up through the lid of the uppermost cabinet CA. As this occurs, the product in chambers C1, C2, C3 and C4 continues to mature. When the product in chamber C4 reaches a desired maturity, such as size S5, the product is harvested from chamber C4 as shown in FIG. 26.4. The root mass is removed and the chamber C4, the lowermost chamber, is removed. The step of trimming the plant stalk of its leaves is repeated and a new top chamber, CB, is added as shown in FIG. 26.5. In this manner, the productive life of the plant may be extended continuously. As will be recognized, the harvesting of the product within the chamber may be of a single size product from the lowermost chamber continuously, or may be from multiple chambers simultaneously if an assortment of product sizes is desired.

As will be recognized, this process enables an extension of the productive life of the plant, whereby the same plant may continue to develop or re-develop for production and the harvesting process repeated. In this manner, the modular chamber aspects of the disclosure enable an extension of the productive life of the plant, offering overall yields of produce that are better than what is attainable in the prior art.

Additional systems for achieving the aforementioned processes will be described. These are alternative embodiments to the example system described with regard to FIGS. 1-22.

FIGS. 27-37.2 illustrate a second grow system embodiment according to an aspect of the disclosure. This system obviates the need for an external frame, as the individual modular grow chambers are stackable, interlocking and form a stable, nested stack that does not need an external frame for support. An external and portable lift and servicing station may be used to manipulate individual grow chambers and may be moved from stack to stack in a mass growing operation. In this example embodiment, the conical top and bottom surfaces provide structure that is adapted to interconnect the grow chambers with one another.

Figure 27:
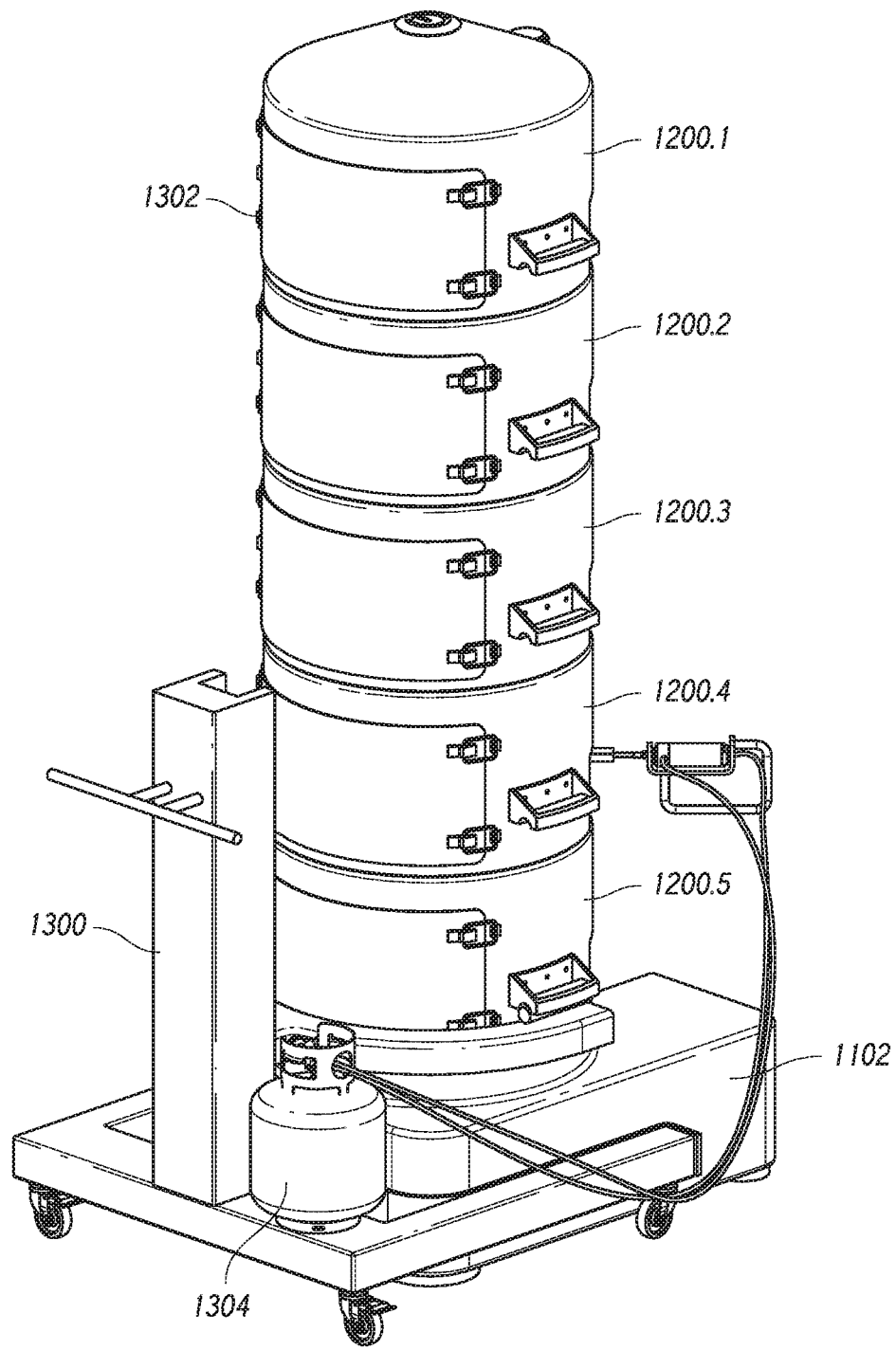
FIGS. 27 and 28 are perspectives of a second example grow system according to an aspect of the disclosure.
Figure 28:
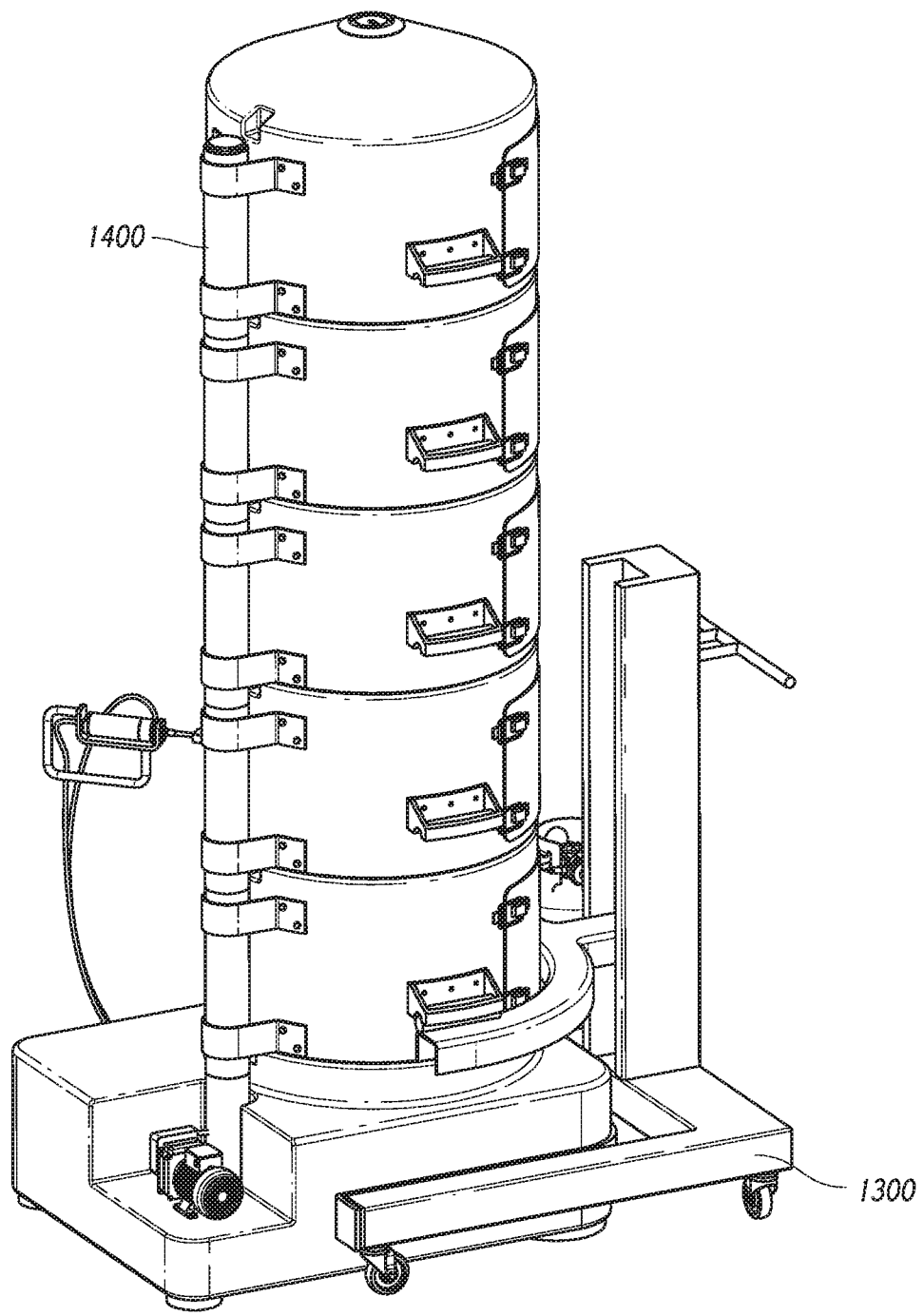

FIGS. 27 and 28 are perspective views of a second grow system embodiment according to an aspect of the disclosure. A number, in this case five, of grow chambers 1200.1-1200.5 are situated in a nested, stacked arrangement on a base 1102. Base 1102 may include integrated nutrient reservoirs and pumping components housed within, and a vertically extending servicing column 1500, which may be formed from interlocking segments, each associated with a respective chamber 1200 and each containing multiple feed and drain lines with quick-connect fittings which allow the feed lines to be interconnected as the chambers 1200 are stacked. Chambers 1200 include respective access doors 1202 which permit access to the interior of respective grow chambers 1200. Access doors 1202 may include a locking watertight seal, incorporating one or more interlocking lips and grooves, for example, around the door frame in order to prevent leakage in an ebb-and-flow application and to retain a volume of liquid (water) maintained within the chamber. Lifting handles 1210 are provided on the sides of each grow chamber and may be engaged by a portable lifting station 1300 for selective lifting and/or lowering of selected chambers 1200.

Lifting station 1300 includes casters 1302 for transport and may be moved between different chamber stacks for servicing. Lifting station 1300 may include a compressed air or gas supply 1304 for operating pneumatic tools, such as a pneumatic knife for severing plant stalks as will be described below. A bottom portion of lifting station may be generally U-shaped and may interlock with a recess formed in the stack base 1102 for additional stability and to ensure alignment of the lifting station with the stack.

Figure 29:
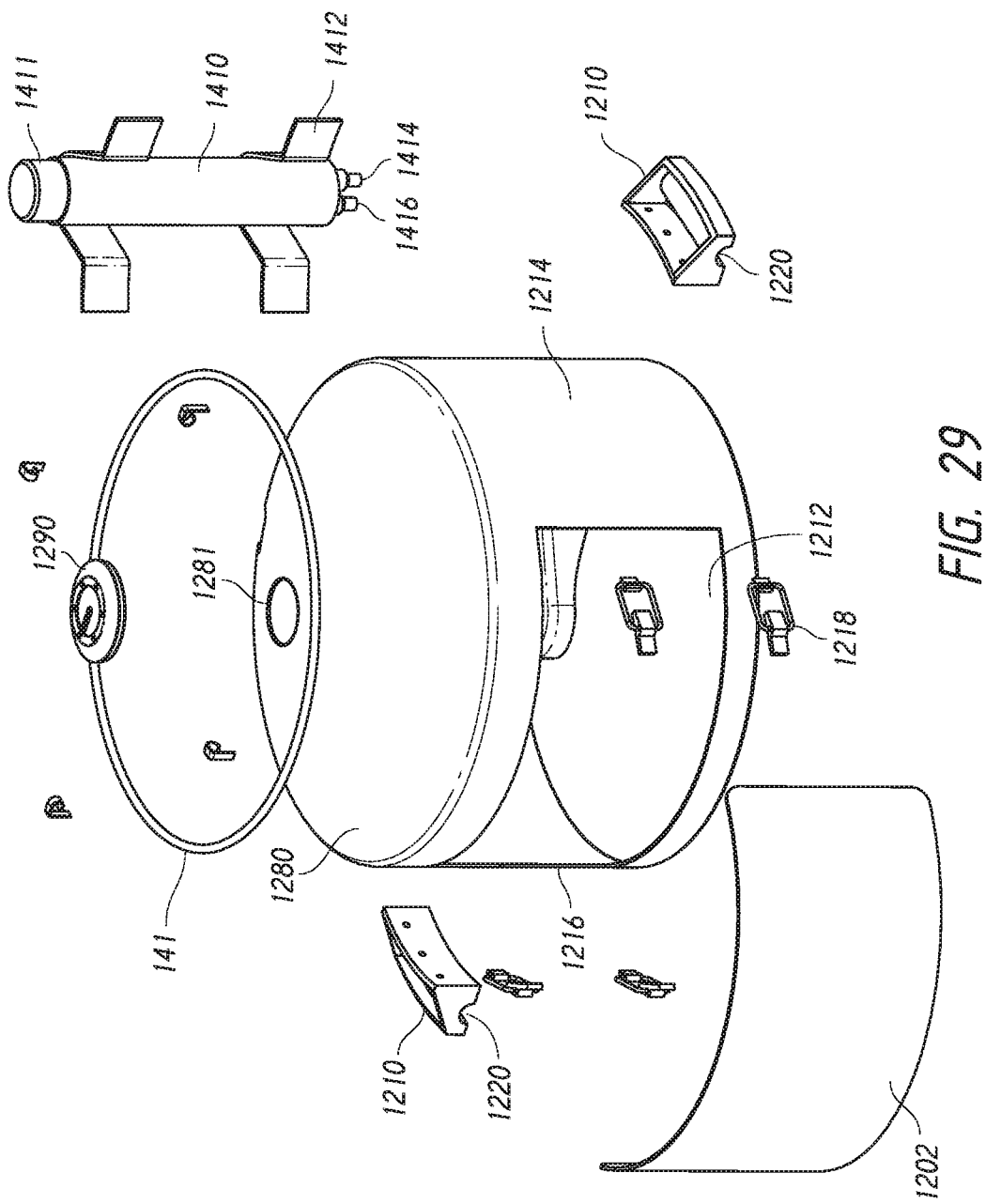
FIG. 29 is an exploded view of a grow chamber in a second example grow system according to an aspect of the disclosure.

FIG. 29 is an exploded view of an example chamber 1200 according to an aspect of the disclosure. Chamber 1200 may include a generally conical-shaped bottom wall 1212, generally cylindrical sidewall 1214 and a generally conical cover or top wall 1280 which may be integrally formed. More particularly, the walls of chamber 1200 may be formed by injection molded of thermoplastic in two or more pieces and then joined by welding or adhesive according to known methods to form a single, unitary structure. Alternatively, the chamber 1200 may be rotomolded or blow molded as a single hollow part. The grow chambers may preferably be formed of a high strength, high toughness and high durability plastic, such as polyethylene.

A generally rectangular access port 1216 may be formed in the chamber sidewall. Access door 1202 may be releasably secured to the chamber wall 1214 with clasps 1218, which may be riveted or otherwise fastened to the sidewall 1214 or door 1202 and which may cooperate with hooks or other fasteners secured to the door 1202 or sidewall 1214. A pair of lifting handles 1210 may be fastened to the sidewall 1214 and may include a contoured surface 1220 on an underside thereof to securely engage a lifting arm of the lifting mechanism 1300.

Figure 30:
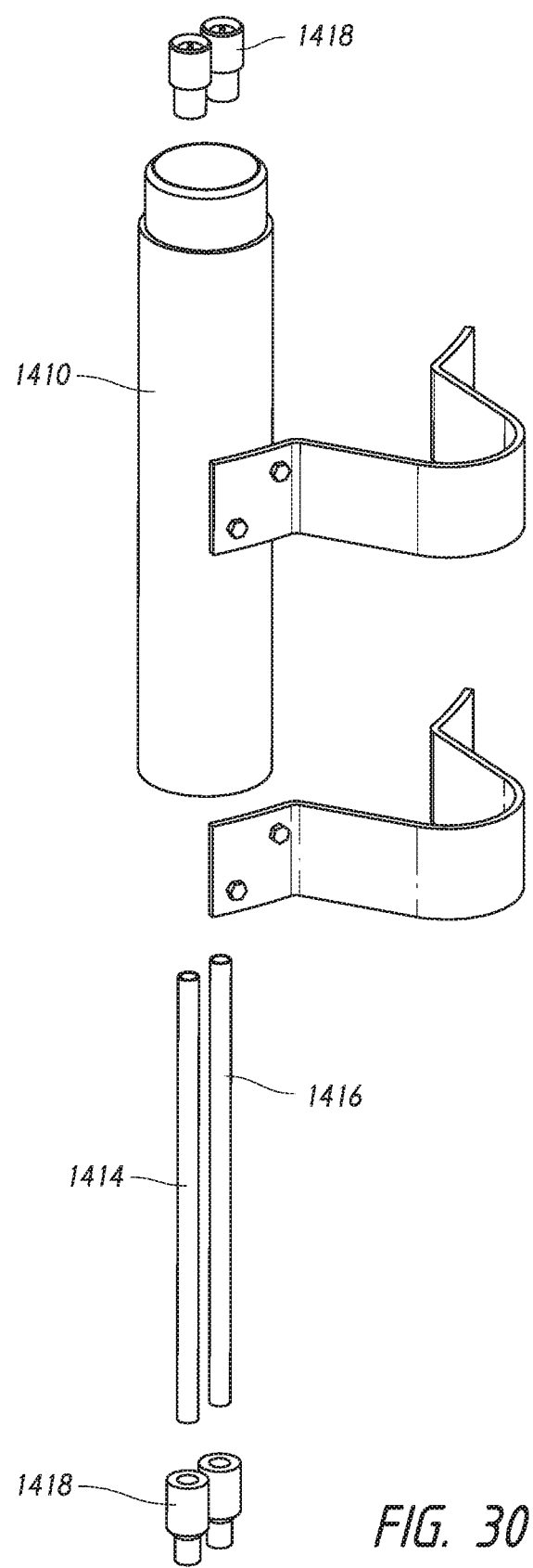
FIG. 30 is an exploded view of an example nutrient distribution system component according to an aspect of the disclosure.

Referring additionally to FIG. 30, a servicing column segment 1410, which may include an interlocking end 1411, may be secured to the chamber sidewall by brackets 1412. Servicing column segment 1410 includes a feed tube segment 1414 and a drain tube segment 1416 housed therein, each provided with an interlocking, quick-connect connectors, 1418 for permitting sealed and secure connections to corresponding segments on neighboring chambers when in a stacked arrangement. Such quick-connect fittings are well-known in the art and may include fittings which, when disconnected, seal the hose segment interiors against leakage.

Figure 32:
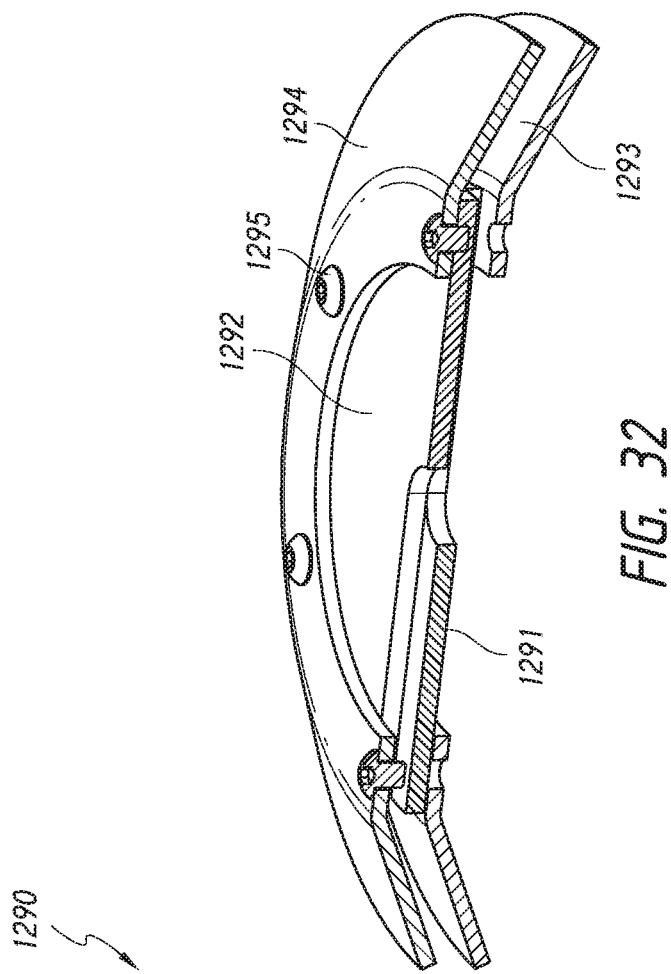
FIG. 32 is an assembled view of a sealing gasket assembly of FIG. 31.
Figure 31:
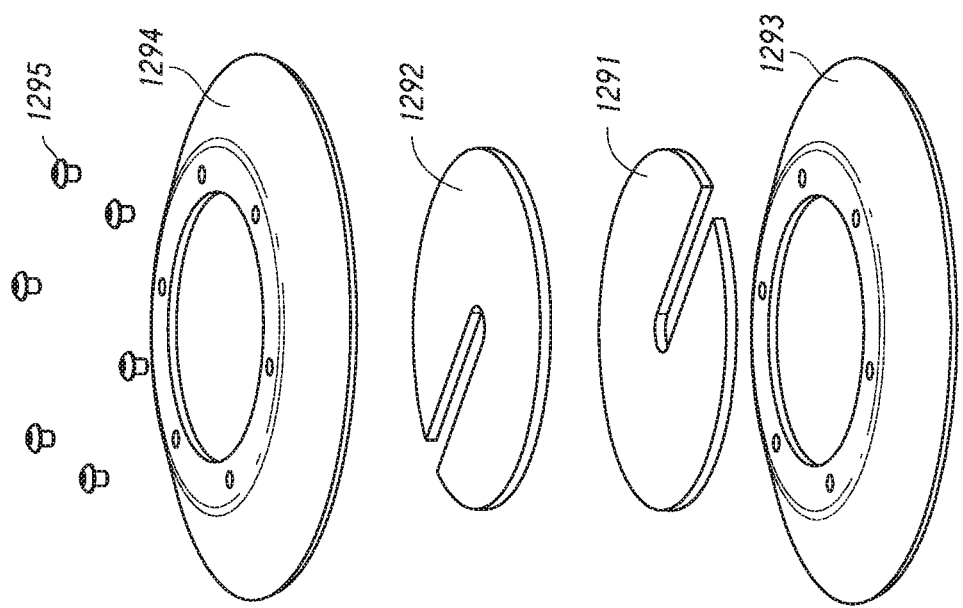
FIG. 31 is an exploded view of a sealing gasket assembly according to an aspect of the disclosure.

The top wall 1280 of the chamber 1200 includes an aperture 1281 to accommodate a plant stalk. A sealing gasket assembly 1290 may be installed in the aperture to provide for sealing engagement with the plant stalk and to prevent passage of light to the interior of the chamber, as well as prevent contaminants and to maintain a generally sealed and controlled condition on the interior of the chamber 1200. FIG. 31, is an exploded view, and FIG. 32, is a sectional view of an assembled gasket assembly 1290. According to an aspect of the disclosure, the gasket assembly 1290 may accommodate the expansion of the plant stem/stalk during growth. More particularly, a pair of slotted, resilient disks 1291 and 1292 are oriented such that the slots extend in opposed directions and sandwiched between a pair of rigid retaining collars 1293 and 1294, which secure the resilient disks 1291 and 1292 within the chamber top wall aperture 1281. Removable screw fasteners 1295 may be used to fasten the assembly together.

Figure 34:
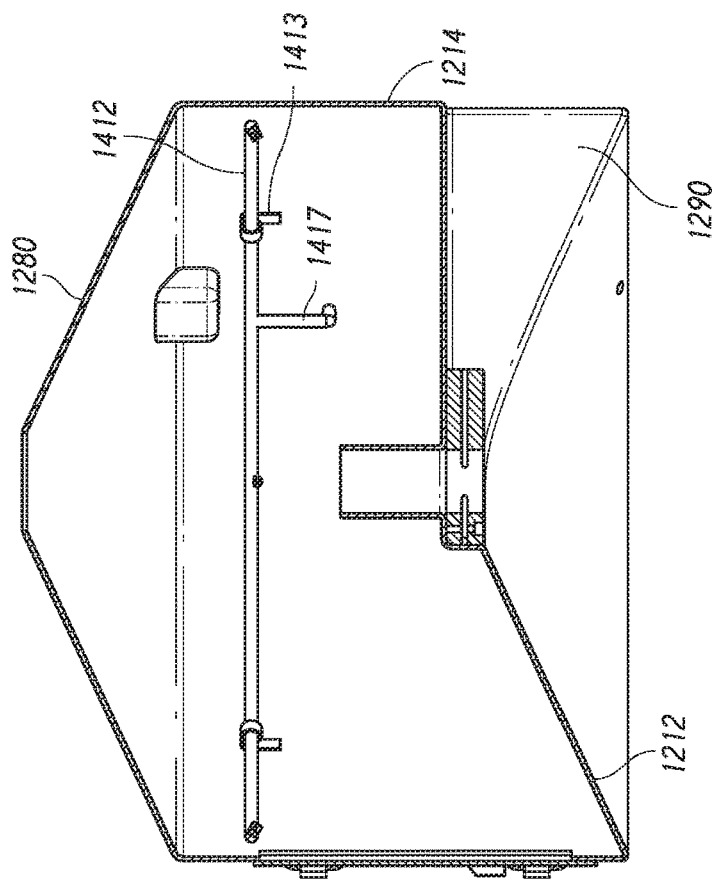
FIGS. 33 and 34 are cross-sectional views of a grow chamber in a second example grow system according to an aspect of the disclosure.
Figure 33:
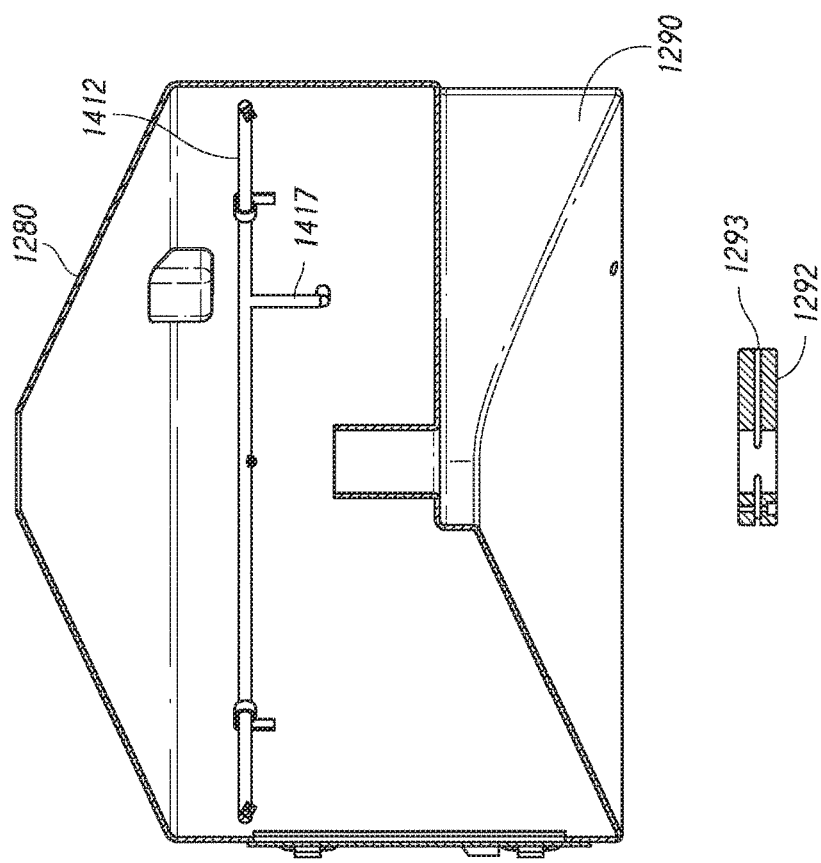

Referring additionally to FIGS. 33 and 34, The delivery of water and nutrients may be provided by a circular delivery conduit 1412 secured within the chamber 1200 via brackets 1413 secured to the sidewall 1214. Delivery conduit 1412 may include an inlet portion 1417, which extends outside the chamber and receives water and nutrients from the feed tube segment 1414 (FIGS. 29 and 30). For aeroponic applications, the delivery conduit 1412 may include nozzles for spraying a mist of nutrients into the interior of chamber 1200. For hydroponic applications, the delivery conduit may include drip elements to maintain a level of liquid within the chamber 1200. Drainage of liquid may be conveyed out of the chamber interior using drain fittings placed at appropriate locations within the chamber bottom wall, and communicating with the drain conduit segment in the service conduit.

Figure 36:
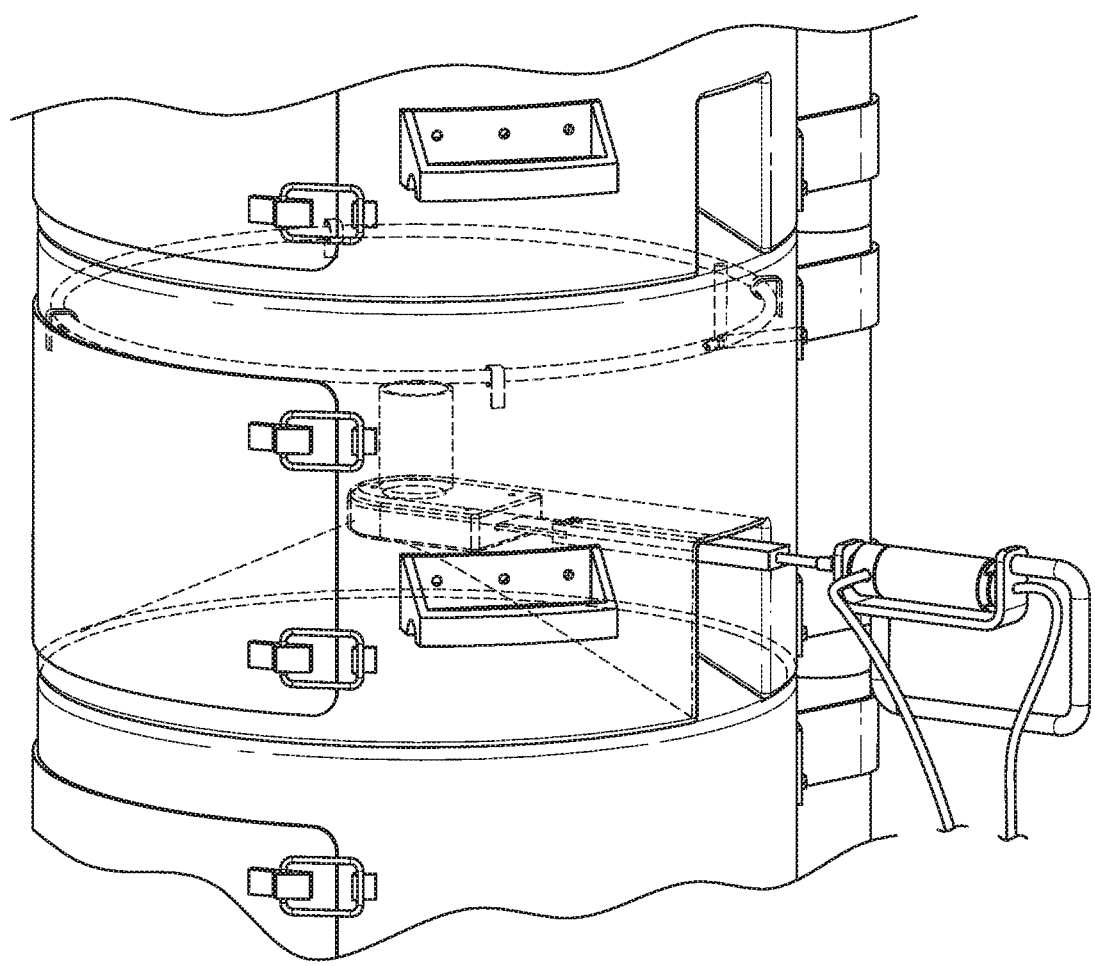
FIG. 36 is a perspective of a cutting assembly according to an aspect of the disclosure.

Still referring to the sectional views in FIGS. 33 and 34, a tool-receiving channel 1290 may be formed in the chamber for permitting an external tool, such as the pneumatic knife, from accessing the interior of the chamber 1200, and particularly the plant stalk/stem growing therein. A knife guide 1292, which includes a slot 1293 therein for guiding the knife, and a circular aperture for surrounding the plant, may be installed within the chamber tool-receiving channel and around the plant stem/stalk. FIG. 35 is a cutaway view showing additional details of the interior of an example chamber 1200. The bottom wall of chamber 1200 may include a tubular portion 1298 extending upward from the tool-receiving channel for further support of the plant stem. Tubular portion 1298 allows the chamber to be filled with liquid in an ebb-and-flow application. As will be recognized, in an ebb-and-flow application. Installation would typically occur prior to plant growth within the chamber, i.e., when the chamber is initially assembled. Referring additionally to FIG. 36, knife guide slot 1293 receives and guides the blade of the pneumatic knife such that an efficient cutting operation can be performed on the plant stalk from outside the chamber 1200 and without contaminating the interior of the chamber 1200.

FIGS. 37.1 and 37.2 illustrate the interaction of an example lifting station with a stack of chambers 1200. As will be recognized by those of ordinary skill in the art, the lifting mechanism may be equipped with hydraulic components to enable the lifting of a portion of, or the entire stack of chambers 1200. More particularly, the bottom chamber 1200.5 may be removed by an operator while the remaining chambers 1200.4, 1200.3 and 1200.2 are lifted by the lifting mechanism. In addition, a top chamber may be installed on the existing stack using the lifting mechanism. The interlocking, conical shape of the chambers 1200 provides for a stable stack structure. Thus, the growing processes described above may be implemented using this second example system, with added advantages that will be apparent to those of ordinary skill in the art.

Figure 39:
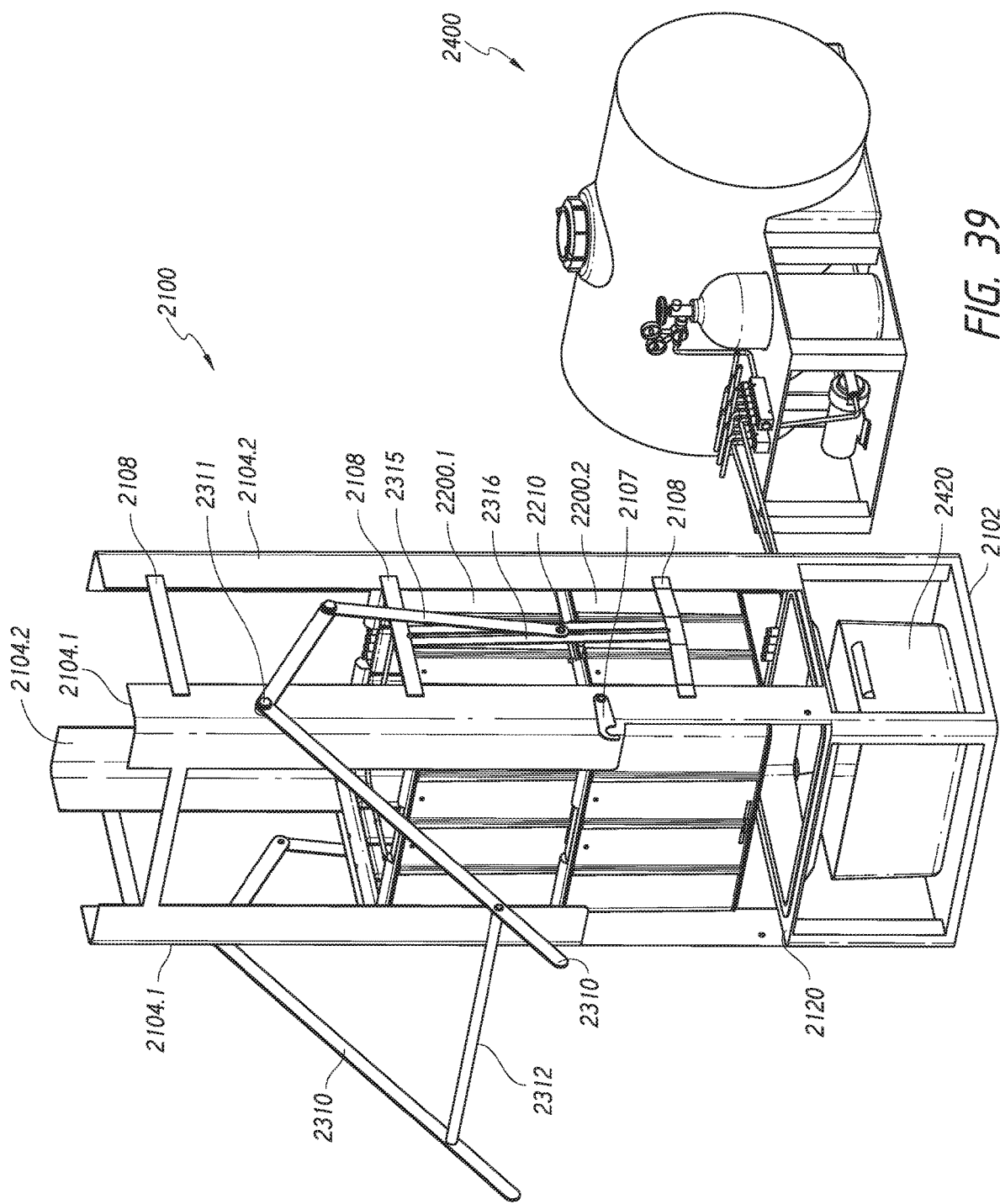
Figure 40:
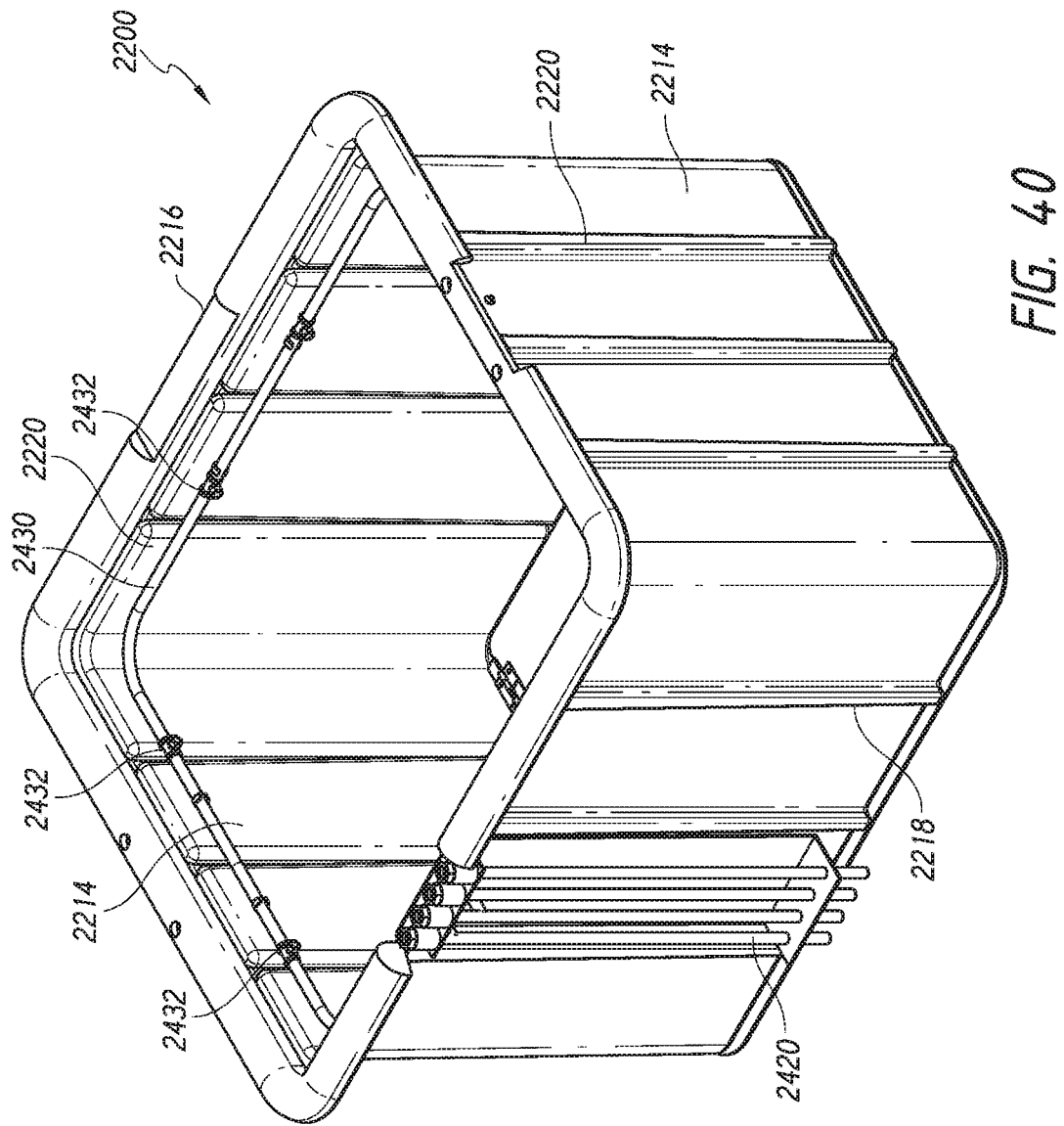
FIG. 40 is a perspective of a grow chamber in a third example grow system according to an aspect of the disclosure.

FIGS. 38.1, 38.2 and 39-44 illustrate a third embodiment of a grow system according to an aspect of the disclosure. This example includes stackable, interlocking grow chambers as well as an external lifting frame with a grow chamber lifting mechanism for permitting an operator to manually lift one or more grow chambers and remove a grow chamber to modify the chamber stack. FIG. 38.1 is a perspective view and FIG. 38.2 is a detailed view as indicated in FIG. 38.1. FIG. 39 is a perspective view. Referring to FIGS. 38.1, 38.2 and 39, an external frame 2100 is comprised generally of a bottom or base 2102, two front vertical posts 2104.1, and two rear vertical posts 2104.2, with transverse reinforcing members 2108 extending between them. Vertical posts 2104 may be of a generally L-shaped cross section and define a vertical column within which the stack of chambers 2200 may be guided and contained. A pair of lifting levers 2310 are pivotally mounted on the frame 2100 via pivots 2311. For mechanical advantage to an operator, L-shaped lifting levers 2310 are pivotably connected to linkage bars 2315. A cross member or handle 2312 permits an operator to operate both lifting levers 2310. As shown in the detailed view in FIG. 38.2, the grow chamber 2200.2 (as well as the other grow chambers) is provided with a lifting pin assembly 2250 fastened on each side (only one side is shown) of the grow chamber 2200.2. Lifting pin assemblies 2250 each include a guide pin 2252, which extends into a slotted guide 2316. Guide pins 2252 may be retractable to disengage from the slotted guide 2316 when the chamber is removed. Lifting pin assemblies 2250 include an extension, partially shown in FIG. 38.2, that extends upward behind the slotted guide 2316 and includes a threaded hole therein. The linkage bars 2315 each include a lifting pin assembly engaging fastener 2210, which may be spring biased, to maintain it in an outward (to the right in FIG. 38.2) position to permit selective engagement with the threaded holes on the lifting pin assembly extensions. Engaging fasteners 2210 thus provide for selective engagement of the linkage bars 2315 with the chamber. Lifting levers 2310 and linkage bars 2315 may thus be used to selectively lift the chamber stack in order to permit removal of a bottom chamber 2200.3, as shown in FIG. 38.1. FIG. 39 shows the chamber stack in a lowered position (with chamber 2200.3 removed). Lifting levers 2310 and linkage bars 2315 thus provide for manual lowering of the stack. As shown in FIG. 39, the lower portions of front vertical posts 2104.1 are configured to permit removal of a bottom grow chamber. Grow chambers may be added to the top of the stack by insertion into the column formed by vertical posts 2104.1 and 2104.2. Thus a grow chamber 2200.2 coinciding with the slotted guides 2316 may be engaged and lifted by an operator using the linkage assembly and the bottom chamber 2200.3 may be removed from the stack. A retaining member or catch 2107 may hold the lifting lever 2310 in the position shown in FIG. 38.1 to enable removal of the bottom chamber 2200.3. Frame 2100 includes a lower chamber support frame 2120 for supporting a bottom chamber and enabling an operator to remove the bottom chamber by sliding it out of the frame 2100.

A nutrient delivery system 2400 may be remote from the frame 2100 and provide nutrients via tubing or conduits. A water collection box 2420 may be located on the bottom surface 2102 of the frame 2100.

Details of a grow chamber 2200 are shown in FIGS. 40-43. Chamber 2200 may include a generally rectangular box having sidewalls 2214, a front wall 2216 and rear wall 2218. Reinforcing ribs 2220 may be formed in the walls for added strength.

According to an aspect of the disclosure, an integrated nutrient delivery system may be provided on the chamber 2200 and may be comprised of a number of quick-connect conduits 2420, which are fastened to the rear wall 2218 of the chamber 2200, and an integrated delivery conduit 2430, which is fastened to the interior of the chamber 2200 and extends along the walls. Delivery conduit 2430 may include a number of spray nozzles 2432. Chamber 2200 may include a rounded upper lip having a generally curved surface for permitting secure seating of another chamber above it.

Figure 41:
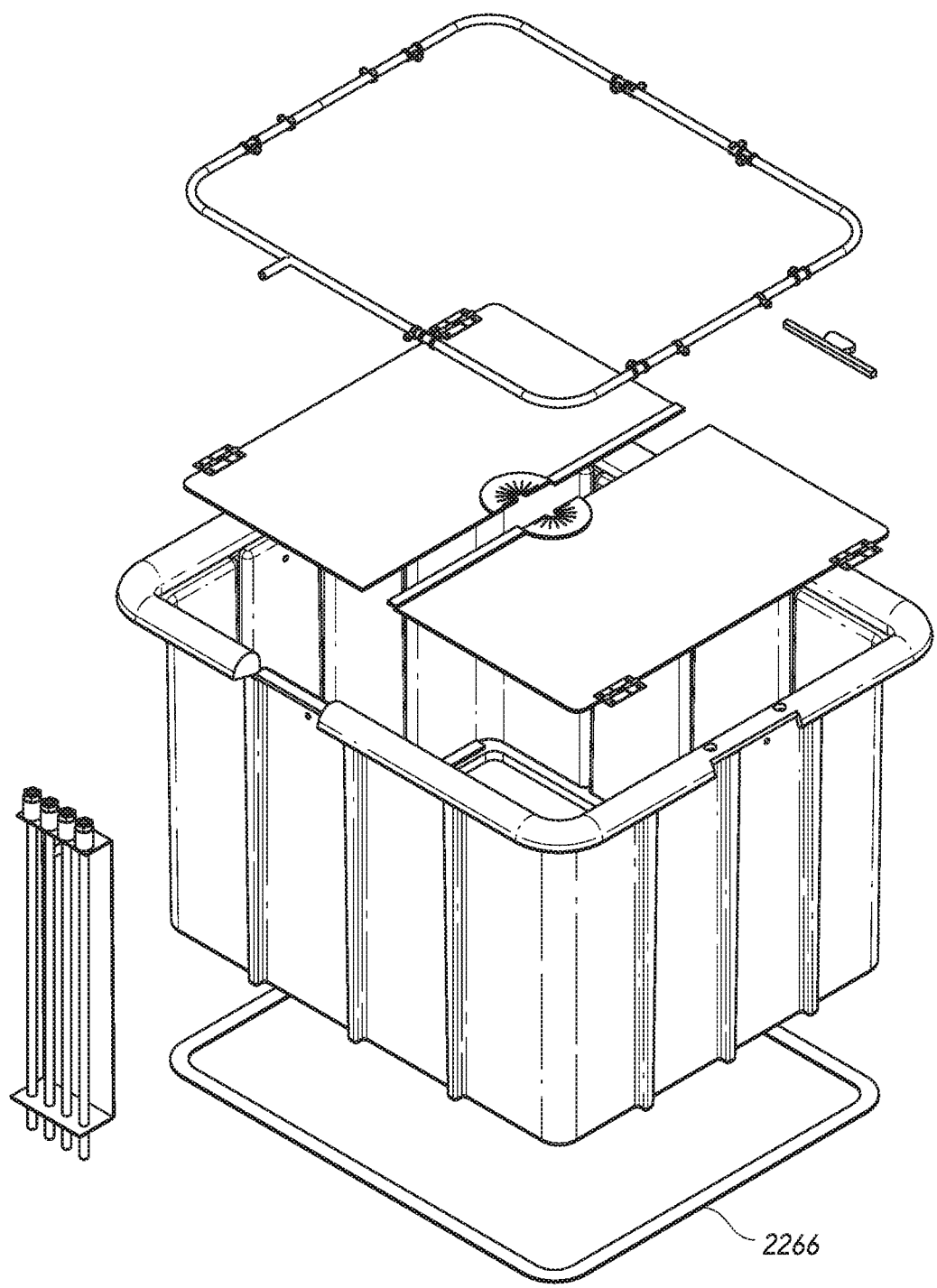
FIGS. 41 and 42 are exploded views of the grow chamber of FIG. 40.
Figure 42:
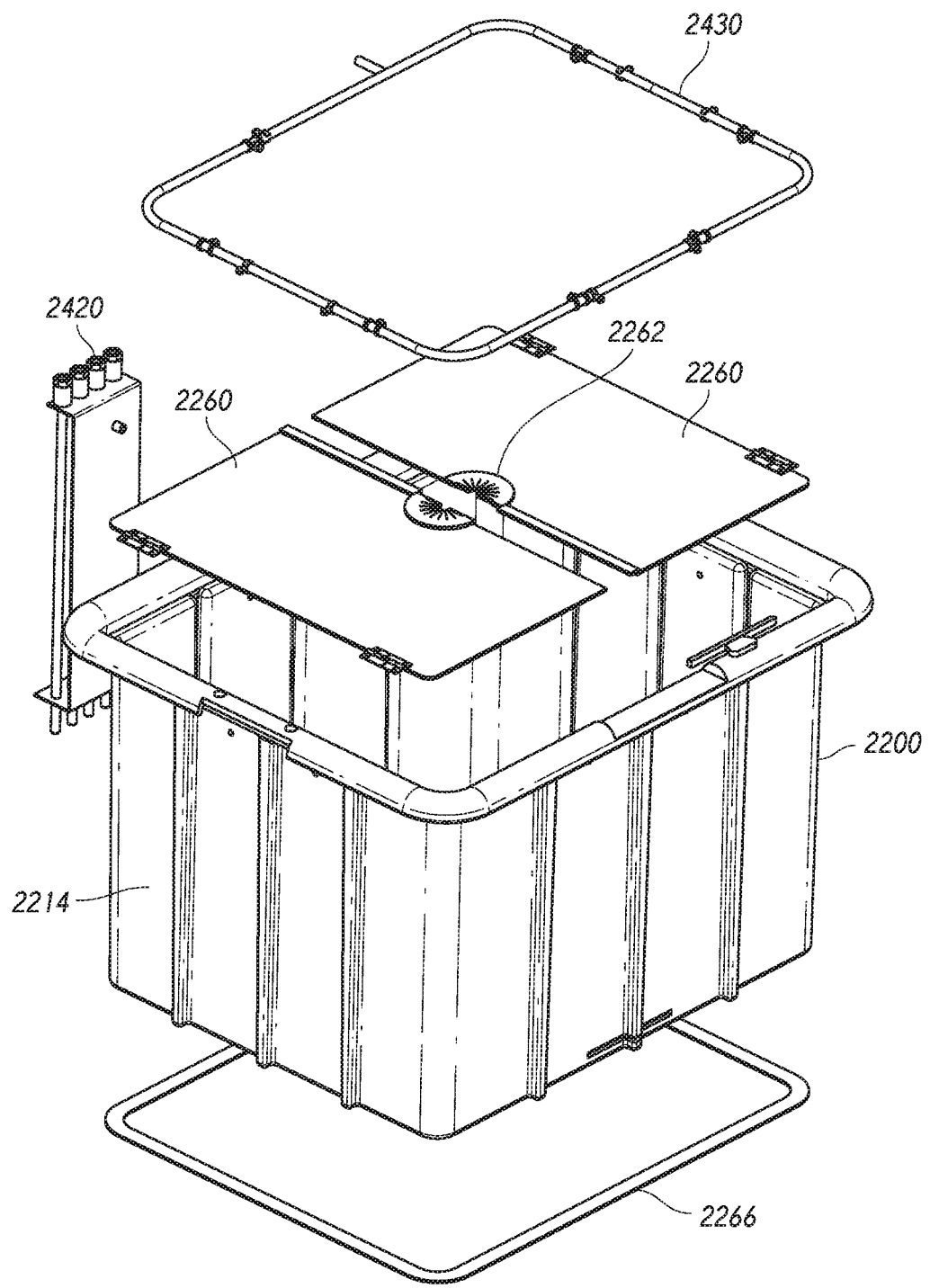
Figure 43:
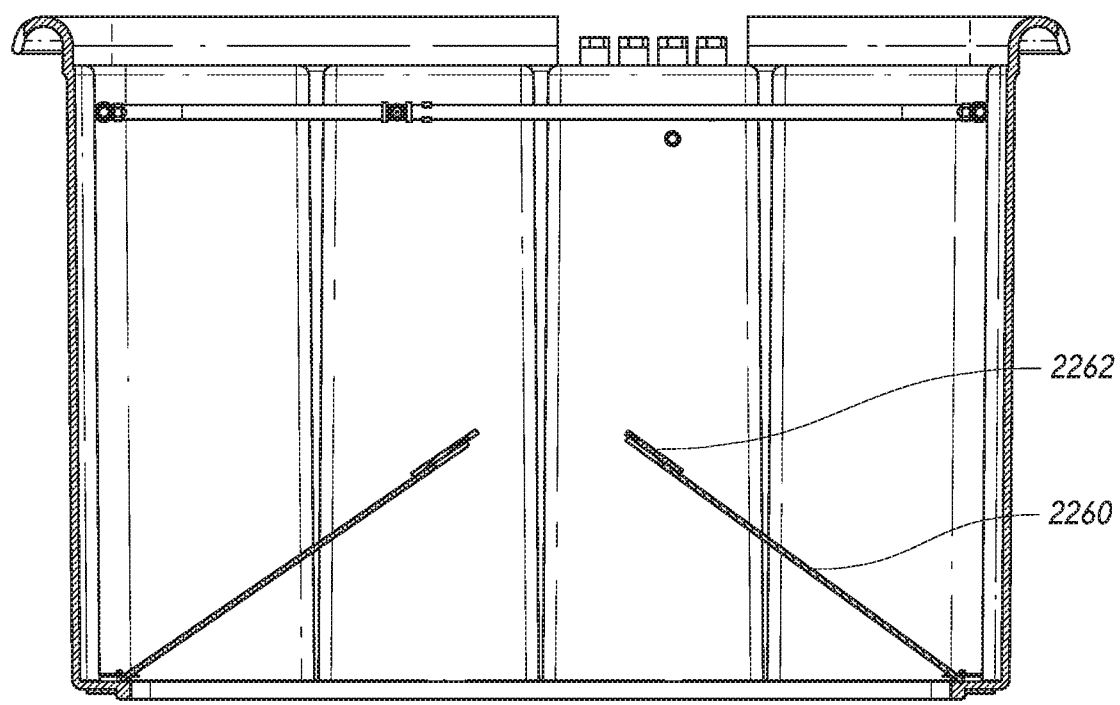
FIG. 43 is a cross-sectional view of the grow chamber of FIG. 40.

Referring additionally to FIGS. 41 and 42, which are exploded perspective views of a grow chamber 2200 according to an aspect of the disclosure, chamber 2200 includes a pair of hinged floor panels 2260 which may be pivotably mounted to the sidewalls 2214 of the chamber 2200. Panels 2260 may include a flexible sealing gasket 2262, in the form of two half-circles that align, for sealing around the plant stem when the panels are in a sealed position. For further sealing of the panels 2260, a gasket element 2266 may be installed on a shoulder formed in the lower edges of the chamber walls, such that the panels are supported on the shoulder and sealingly engage the gasket when the panels are in a horizontal position, forming the floor of the chamber. Panels 2260 may be spring-biased towards a horizontal position as shown in FIGS. 41 and 42, and may pivot upwards, as shown in FIG. 43 to permit installation around a plant canopy, without damage thereto.

Figure 44:
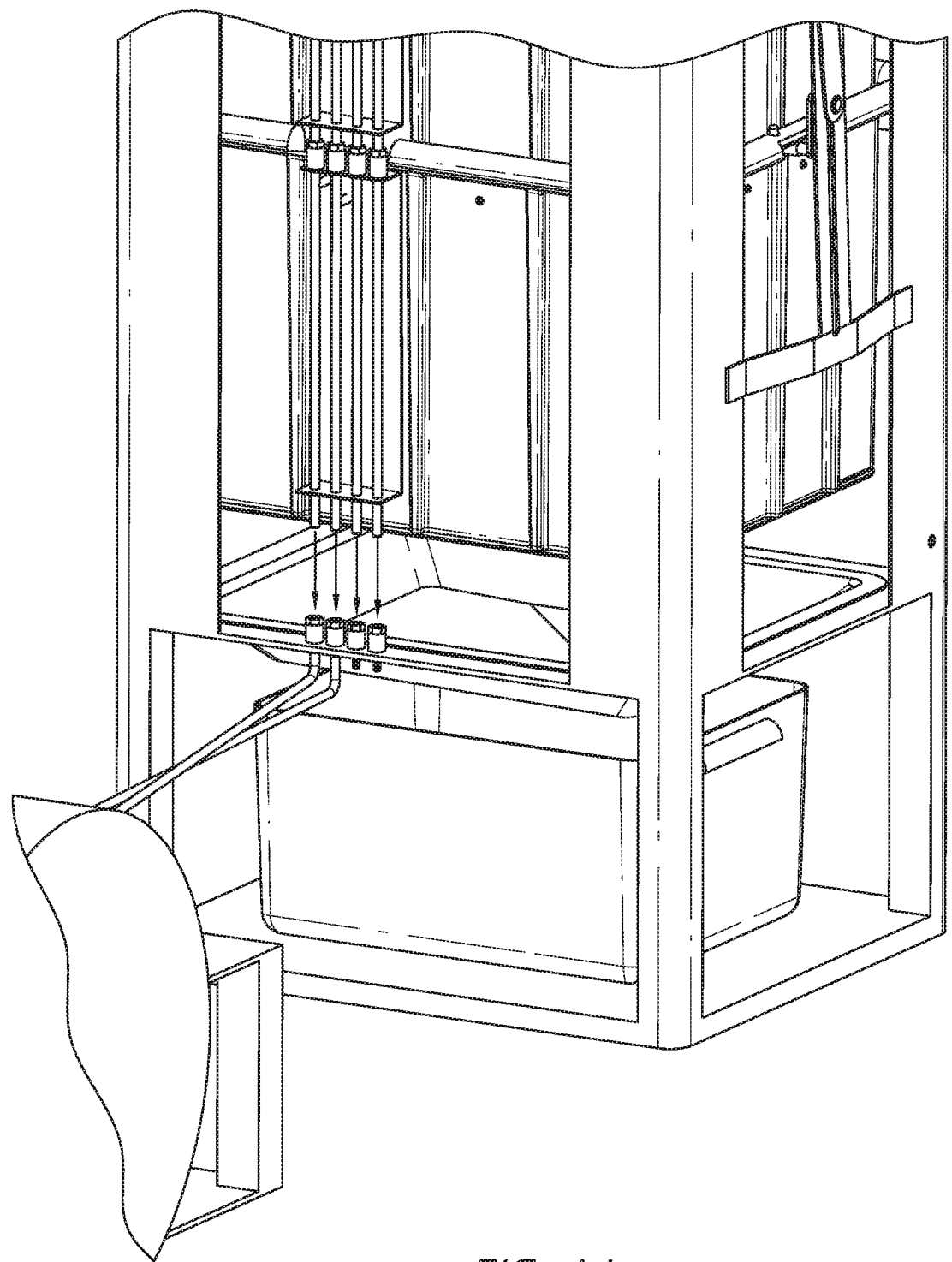
FIG. 44 is a perspective of an interconnecting coupling for a nutrient distribution system according to an aspect of the disclosure.

FIG. 44 is a perspective view showing quick-connect fittings provided on the frame 2100 for receiving connections from corresponding conduits on a bottom chamber 2200.5 as it is lowered into position. For clarity, the connections of the additional nutrient delivery lines from the reservoir are omitted from this figure.

In operation, new chamber may be installed on the top of the stack by an operator and guided within the L-shaped vertical members 2104 of the frame 2100. As the chamber is lowered onto a neighboring chamber below, the pivotable panels 2260 pivot upwards to accommodate a plant canopy, then return to their biased, horizontal position with the gasket 2262 sealing around the plant stem against light passage. Also as the chamber is lowered, the interlocking conduits 2420 seat within corresponding parts on the chamber below such that the chamber may receive nutrients delivered via the nutrient delivery system.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents.

It will be recognized that, while the above description utilizes particular root vegetable (tuber) plant types, such as potatoes, for illustrative example only, the inventions embodied in the example systems may provide growing systems applied to a diverse array of other plants and plant types, including other root vegetables, including but not limited to tuberous root and taproot plants, such as taro, yam, ginger, turnip, yucca, carrot, as well as other plant types.

The invention claimed is:

1. A grow system for managing the growth of plants comprising:
   a plurality of grow chambers, each of the grow chambers being adapted to interconnect with one another to form a grow chamber stack;
   each grow chamber being adapted to provide a controlled growth environment, separate from the growth environment provided by the other grow chambers in the stack, for a respective section of a single one of the plants when the grow chamber is positioned in the grow chamber stack;
   at least two of the grow chambers each defining a respective plant section growth pathway extending through the respective one of the at least two grow chambers, the respective plant section growth pathways being vertically aligned when the grow chambers are stacked, the plant section growth pathways together defining a vertical growth pathway extending through the stack.

2. The grow system of claim 1, wherein at least one of the grow chambers defines respective lateral growth pathways extending from the vertical growth pathway.

3. The grow system of claim 1, wherein at least one of the grow chambers includes at least one sidewall and at least one access port in the at least one sidewall.

4. The grow system of claim 3, wherein at least one of the grow chambers includes a removable panel for selectively covering the at least one access port.

5. The grow system of claim 4, wherein the access port includes at least one interlocking lip for engaging the removable panel.

6. The grow system of claim 1, wherein at least one of the grow chambers includes at least two floor panels that cooperate to form a floor of the respective chamber.

7. The grow system of claim 1, wherein at least one of the grow chambers includes at least one floor panel.

8. The grow system of claim 7, wherein the at least two floor panels in each chamber include a recess formed therein.

9. The grow system of claim 8, where the recess formed in each floor panel includes a gasket for interfacing with the plant.

10. The grow system of claim 1, wherein at least one grow chamber includes at least one lifting interface.

11. The grow system of claim 1, further comprising a lifting station for selectively supporting one or more of the grow chambers in the grow chamber stack.

12. The grow system of claim 1, further comprising a frame for supporting one or more of the grow chambers.

13. The grow system of claim 1, wherein at least one of the chambers includes elements for engaging an adjacent chamber in the stack.

14. The grow system of claim 1, further comprising a nutrient distribution system for distributing nutrients to one or more of the chambers in the chamber stack.

15. The grow system of claim 14, wherein at least one of the grow chambers comprises an integrated nutrient distribution sub-system for distributing nutrients in the grow chamber, wherein the nutrient distribution sub-system includes quick connect fittings for coupling the nutrient distribution sub-system to the nutrient distribution system.

16. The grow system of claim 1, wherein at least two of the grow chambers in the stack are of identical construction.

17. The grow system of claim 1, further comprising a support structure within at least one of the grow chambers for supporting a section of the plant.

18. A grow system for managing the growth of plants comprising:
   a plurality of grow chambers, each grow chamber including a floor and at least one side wall and defining an interior space being adapted to provide a controlled growth environment, separate from the growth environment provided by the other grow chambers in the stack, for a respective section of a single one of the plants when the grow chamber is positioned in the grow chamber stack;
   at least two of the grow chambers each defining a respective plant section growth pathway extending through the floor of the respective one of the at least two grow chambers, the respective plant section growth pathways being vertically aligned when the grow chambers are stacked, the plant section growth pathways together defining a vertical growth pathway extending through the stack.

* * * * *